(12) United States Patent
Yuan et al.

(10) Patent No.: US 12,474,887 B2
(45) Date of Patent: Nov. 18, 2025

(54) METHOD AND SYSTEM FOR SHARING AUDIO STREAM

(71) Applicant: BEIJING XIAOMI MOBILE SOFTWARE CO., LTD., Beijing (CN)

(72) Inventors: Huanhuan Yuan, Beijing (CN); Tianru Zhang, Beijing (CN); Jingxuan Qi, Beijing (CN); Haoheng Wang, Beijing (CN); Di Xu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 560 days.

(21) Appl. No.: 17/956,801

(22) Filed: Sep. 29, 2022

(65) Prior Publication Data
US 2023/0221918 A1    Jul. 13, 2023

(30) Foreign Application Priority Data
Jan. 12, 2022  (CN) .................. 202210032598.7

(51) Int. Cl.
*G06F 3/16*  (2006.01)
*H04M 1/72412*  (2021.01)

(52) U.S. Cl.
CPC ........ *G06F 3/165* (2013.01); *H04M 1/72412* (2021.01)

(58) Field of Classification Search
CPC .................. G06F 3/165; H04M 1/72412
See application file for complete search history.

(56) References Cited

U.S. PATENT DOCUMENTS

| | | | | |
|---|---|---|---|---|
| 2008/0207115 A1* | 8/2008 | Lee | ......... | H04L 67/52 455/3.06 |
| 2016/0103652 A1* | 4/2016 | Kuniansky | ......... | H04L 65/00 700/94 |
| 2020/0379713 A1* | 12/2020 | Carrigan | ......... | G06F 3/0481 |
| 2022/0070247 A1* | 3/2022 | Wang | ......... | H04L 67/75 |

FOREIGN PATENT DOCUMENTS

EP       3886328 A1    9/2021

OTHER PUBLICATIONS

Extended European Search Report of EP Application No. 22198486.7 dated Jun. 9, 2023 (7p).

* cited by examiner

*Primary Examiner* — David Bilodeau
(74) *Attorney, Agent, or Firm* — Arch & Lake LLP

(57) ABSTRACT

A method for sharing an audio stream includes: in response to receiving an audio sharing request, obtaining by a first device, state information of a second device; displaying by the first device, identification information of the second device based on the state information of the second device; and in response to receiving a sharing trigger request, sending by the first device, an audio stream to be shared to the second device based on the identification information of the second device.

19 Claims, 12 Drawing Sheets

Audio Components in the Control Center audio projection interface

METHOD AND SYSTEM FOR SHARING AUDIO STREAM

CROSS REFERENCE TO RELATED APPLICATIONS

This application is based upon and claims priority to Chinese Patent Application No. 202210032598.7, filed on Jan. 12, 2022, the entire disclosure of which is incorporated herein by reference for all purposes.

TECHNICAL FIELD

The disclosure relates to the technical field of electronic devices, in particular to a method for sharing an audio stream, an apparatus for sharing an audio stream, an electronic device and a storage medium.

BACKGROUND

Low Energy (LE) audio, as a new-generation Bluetooth audio technology standard, not only improves the performance of the standard Bluetooth audio, but also enables many new use cases, which provides the users with novel ways to enjoy and share wireless audios. Broadcast Audio (BA) is one of the three major features of the new-generation Bluetooth LE Audio standard, which will allow an audio source device to simultaneously broadcast one or more audio streams to an unlimited number of audio receiver devices, and bring new experiences such as Bluetooth audio sharing.

SUMMARY

A first aspect of the disclosure provides a method for sharing an audio stream. The method includes: in response to receiving an audio sharing request, obtaining by a first device, state information of a second device; displaying by the first device, identification information of the second device based on the state information of the second device; and in response to receiving a sharing trigger request, sending by the first device, an audio stream to be shared to the second device based on the identification information of the second device.

A second aspect of the disclosure provides a method for sharing an audio stream. The method includes: in response to receiving a sharing trigger request, receiving by a second device, an audio stream to be shared sent by a first device; and controlling by the second device, play of the audio stream to be shared.

A third aspect of the disclosure a system for sharing an audio stream. The system may include a speaker, configured to play the audio stream; a second device, connected to the speaker and configured to control the play of the speaker; and a first device, configured to obtain state information of the second device in response to receiving an audio sharing request; display identification information of the second device based on the state information of the second device; and send the audio stream to the second device by using the identification information of the second device, in response to receiving a sharing trigger request.

Additional aspects and advantages of embodiments of disclosure will be given in part in the following descriptions, become apparent in part from the following descriptions, or be learned from the practice of the embodiments of the disclosure.

BRIEF DESCRIPTION OF THE DRAWINGS

The above and other aspects and advantages of embodiments of the disclosure will become apparent and more readily appreciated from the following descriptions made with reference to the accompanying drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In the related art, the function of sharing an audio stream needs to be enabled first, the current device is set as an initiator, and a Bluetooth interface is provided to search for a device that may receive an audio stream to be shared. After the available device is selected, the pairing between the available device and the initiator may be performed. The whole process is divided into several independent processes.

In this existing method, the processes for enabling the function of sharing an audio stream and searching for an available device are cumbersome, the operation for sharing the audio stream is inconvenient, the efficiency of sharing the audio stream is not high, and the sharing effect is not good. In order to overcome these defects in the existing method, the disclosure provides a method and a system for sharing an audio stream as described below.

Figure 1:
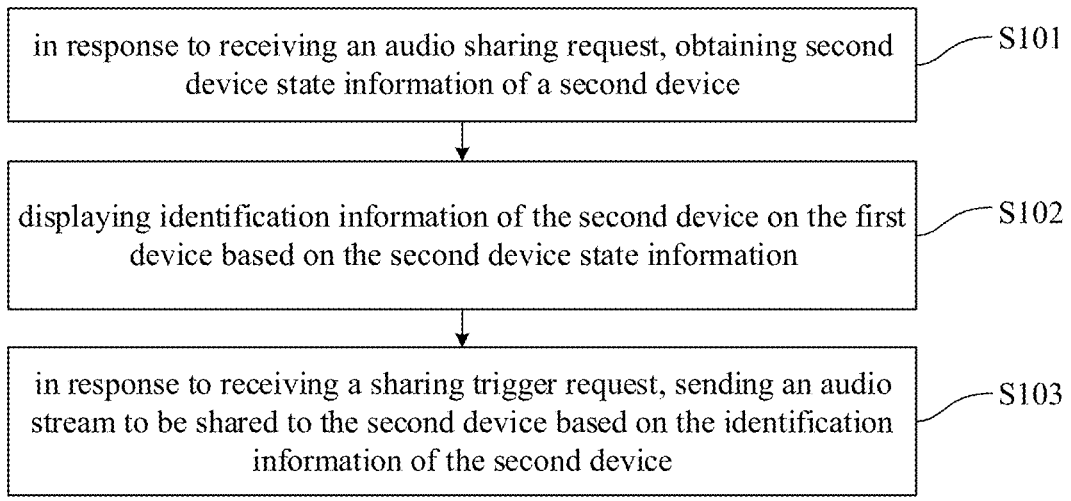
FIG. 1 is a schematic flowchart of a method for sharing an audio stream according to an example of the disclosure.

FIG. 1 is a schematic flowchart of a method for sharing an audio stream according to the example of the disclosure.

It should be noted that, in the examples of the disclosure, information such as location information and audio streams are obtained after authorization by the relevant users, and the process conforms to the provisions of relevant laws and regulations, and does not violate public order and good customs.

It should be noted that the method for sharing an audio stream in this example is executed by an apparatus for sharing an audio stream, which may be implemented by software and/or hardware. The apparatus may be configured in an electronic device, and the electronic device may include but not limited to a terminal and a server.

The method for sharing an audio stream in this example may be applied to a first device. The first device initiates audio stream sharing to a second device, that is, the first device may be an electronic device at an initiator of the shared audio stream. Correspondingly, the second device may be an electronic device at a receiving end of the shared audio stream. The first device and the second device are both electronic devices with a new-generation Bluetooth LE Audio function, such as smartphones, computers and telephones, which is not limited herein.

As illustrated in FIG. 1, the method for sharing an audio stream includes the following steps at S101-S103.

At S101, in response to receiving an audio sharing request, second device state information of a second device is obtained.

The audio sharing request is a request for triggering the audio stream sharing between the first device and the second device. The audio sharing request may be generated by the first device in response to receiving sharing operation instructions from a user, which is not limited.

The state information of the second device in the real space may be referred to as the second device state information. The second device state information may be, for example, a location of the second device in the real space, and an operation state of the second device in the real space, which is not limited.

In this example of the disclosure, the first device obtains the second device state information of the second device based on the audio sharing request. For example, the first device uses a wireless method (such as Bluetooth and Local Area Network (LAN)) to search for the second device within the area, and obtains information such as the location of the second device, the current operation state of the second device, as the second device state information. Alternatively or additionally, the first device may also use a network technology to obtain the second device state information corresponding to the second device from the network, which is not limited.

Optionally, in some examples, obtaining the second device state information of the second device may include obtaining a second device location of the second device, and determining the second device location as the second device state information. Since the second device location is determined as the second device state information, the second device location may accurately represent the second device state information, which facilitates the first device to rapidly search for the second device having the audio stream sharing needs, thus effectively improving the management convenience.

The second device location may be a location of the second device obtained based on the Global Positioning System (GPS), or may be distance information between the location of the second device and a reference location, which is not limited.

In the example of the disclosure, obtaining the second device location of the second device may include obtaining the second device location by using the Bluetooth function, at this time, the first and second devices simultaneously enables the Bluetooth function, or obtaining the second device location of the second device from a cloud platform, or obtaining the second device location of the second device by using a wireless communication technology such as a cellular network. Any other possible manners may also be used to obtain the second device location of the second device, which is not limited.

At S102, identification information of the second device is displayed on the first device based on the second device state information.

The information for uniquely identifying the second device is referred to as the identification information of the second device. The identification information of the second device may be, for example, a nickname of an application program that plays the audio stream in the second device, and communication link information of the second device, which is not limited.

In the example of the disclosure, the first device may have a display interface, and the display interface may be, for example, a digital tube display screen, a liquid crystal display screen, which is not limited.

In the example of the disclosure, displaying the identification information of the second device on the first device based on the second device state information may include displaying the identification information of the second device on the first device based on the second device location. In the example of the disclosure, when the identification information of the second device is displayed on the first device, the identification information of the second device may be displayed on the display interface of the first device based on information such as the direction and distance of the second device location, or, the identification information of the second device is displayed on a drop-down display area in the first device, which is not limited.

In the example of the disclosure, displaying the identification information of the second device on the first device based on the second device state information may include: extracting the identification information of the second device and the second device location; and displaying the identification information of the second device on the display interface of the first device according to certain display configuration rules and based on factors such as the distance and direction of the second device location with respect to the first device, which is not limited.

For example, a center point may be set in the display interface of the first device. When the second device location is far from the first device, the information of the second device in the display interface is farther away from the center point, so that the identification information of multiple second devices may be visually and vividly displayed. In this way, the user of the first device rapidly and conveniently searches and locates the second device that may share the audio stream in future based on the displayed identification information of the second device, and supports the first device to manage the sharing and connection of the audio stream.

At S103, in response to receiving a sharing trigger request, an audio stream to be shared is sent to the second device based on the identification information of the second device.

The first device provides sharing triggering interfaces configured to receive a user input request for triggering transmission of the shared audio stream, the request may be called the sharing trigger request.

The audio stream to be shared by the first device to the second device may be referred to as the audio stream to be shared. The audio stream to be shared may be an audio data stream such as a song or a voice in the first device, which is not limited.

In the example, the first device selects the audio stream to be shared that is to be transmitted according to the sharing needs, when the second device confirms to establish an audio stream sharing connection with the first device, the first device responds to the sharing trigger request, and sends the audio stream to be shared to the second device based on the identification information of the second device, which is not limited.

In the example, in response to receiving the sharing trigger request, the first device identifies the identification information of the second device that is connected and capable of audio stream sharing, and sends the audio to be shared to the second device by Bluetooth transmission, or by using wireless communication technologies (e.g., Wi-Fi transmission), or any other possible wireless transmission manners, which is not limited.

In the example, in response to receiving the audio sharing request, the second device state information of the second device is obtained. The identification information of the second device is displayed on the first device based on the second device state information. In response to receiving the sharing trigger request, the audio stream to be shared is sent to the second device based on the identification information of the second device. Since in response to receiving the sharing trigger request, the identification information of the second device is displayed on the first device in consideration of the second device state information, so that it is convenient for the first device to rapidly search for or identify the second device having the audio stream sharing needs, so as to realize audio stream sharing. Therefore, the process of sharing the audio stream may be simplified, the convenience of the audio stream sharing operation may be effectively improved, and the efficiency of sharing the audio stream and the sharing effect may be improved.

Figure 2:
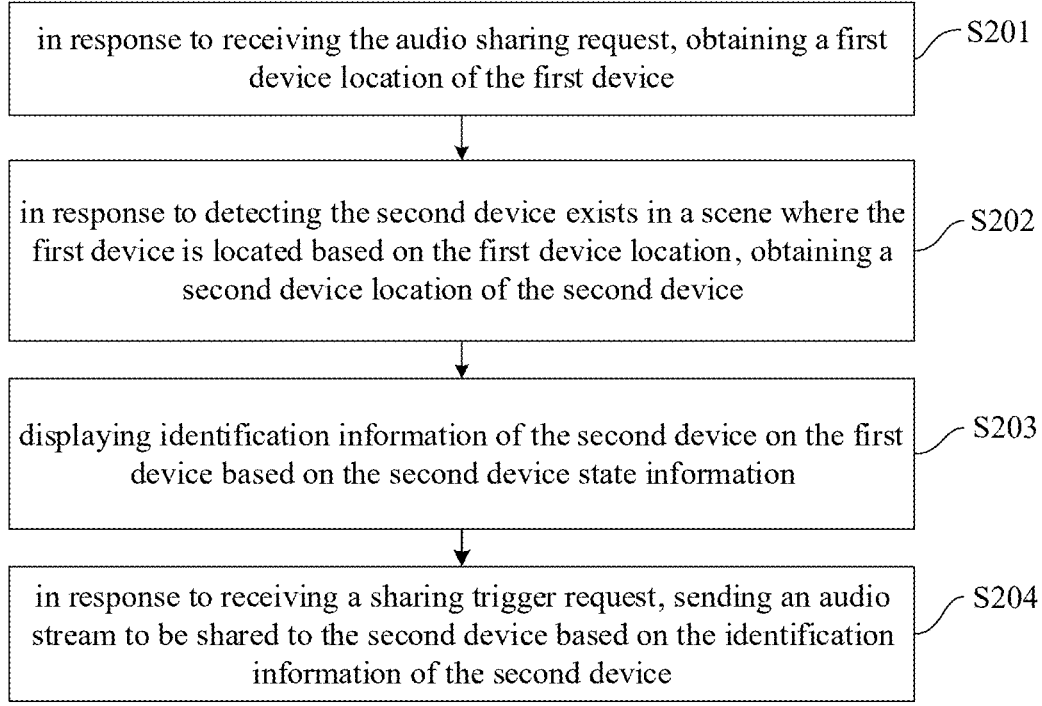
FIG. 2 is a schematic flowchart of a method for sharing an audio stream according to another example of the disclosure.

FIG. 2 is a schematic flowchart of a method for sharing an audio stream according to another example of the disclosure.

As illustrated in FIG. 2, the method for sharing an audio stream includes the following steps at S201-S204.

The method for sharing an audio stream in the example may be applied to the first device. The first device initiates the audio stream sharing to the second device.

At S201, in response to receiving the audio sharing request, a first device location of the first device is obtained.

The location of the first device in the real space may be referred to as the first device location. The first device location may be a virtual location representing the first device in an electronic map, or a relative location of the first device relative to the second device, such as an orientation and a distance, which is not limited.

In the example of the disclosure, in response to receiving the audio sharing request, a positioning module in the first device is enabled to determine the first device location. Alternatively, in response to receiving the audio sharing request, a device location confirmation request is sent to a big data platform, to obtain the location of the first device positioned by the big data platform in response to receiving the device location confirmation request, and the location of the first device is determined as the first device location. Alternatively, in response to receiving the audio sharing request, any other possible way may be adopted to obtain the relative location of the first device relative to the second device and determine the relative location as the first device location, which is not limited.

That is, in the example of the disclosure, the audio sharing request directly triggers obtaining the first device location of the first device. Based on the first device location, the second device is determined, that may support the function of sharing audio and video streams in the scene where the first device is located. In this way, it is possible to rapidly and conveniently obtain the relevant information of the second device that may support the audio and video stream sharing function in the scene where the first device is located, so that the first device may rapidly search for the second device having the audio stream sharing needs, to realize the audio stream sharing.

At S202, in response to detecting the second device in a scene where the first device is located based on the first device location, the second device location of the second device is obtained.

In the example of the disclosure, assuming that the first device is set as a center, the second device is detected by searching an area within a certain range from the center. The detection method may be executed by using Bluetooth to identify and detect each other, or by using the wireless communication technology (e.g., Wi-Fi connection) to detect the existence of the second device in the scene where the first device is located, or by determining that the second device is detected in the scene where the first device is located according to the virtual location on the map, which is not limited.

Optionally, detecting the second device in the scene where the first device is located based on the first device location may include: determining a scanning location area based on the first device location; and in response to detecting a device connected to a speaker device in the scanning location area, determining the device connected to the speaker device as the second device. Since the device connected to the speaker device is determined as the second device in the scanning location area, and the possibility, that the device not connected to the speaker device has audio stream sharing needs, is small, the example of the disclosure supports the recognition of the device that has been connected to the speaker device and determine the device that has been connected to the speaker device as the second device, which may effectively avoid interference to the scanning result brought by other devices that are not connected to the speaker device, so that the scanning and confirmation efficiency of the identification information of the second device is improved to a greater extent, and the efficiency of sharing the audio stream is effectively enhanced.

A location area for scanning detection within a certain range may be called the scanning location area. The first device scans the scanning location area to determine whether the second device exists in the scene where the first device is located.

A device for receiving an electrical signal and converting it into a sound signal may be referred to as a speaker device. The speaker device may be, for example, a speaker, a public amplifier, a sound box, and an earphone, which is not limited thereto.

In the example of the disclosure, a preset linear distance may be determined as a detectable distance, and pieces of identification information for one or more second devices within the detectable distance are detected and recognized. Alternatively, it may also be possible to scan one or more second devices capable of receiving the audio sharing requests within a capability range of a detection hardware based on the performance, power consumption and other parameters of the detection hardware, and determine the identification information corresponding to the one or more second devices, which is not limited herein.

Figure 3:
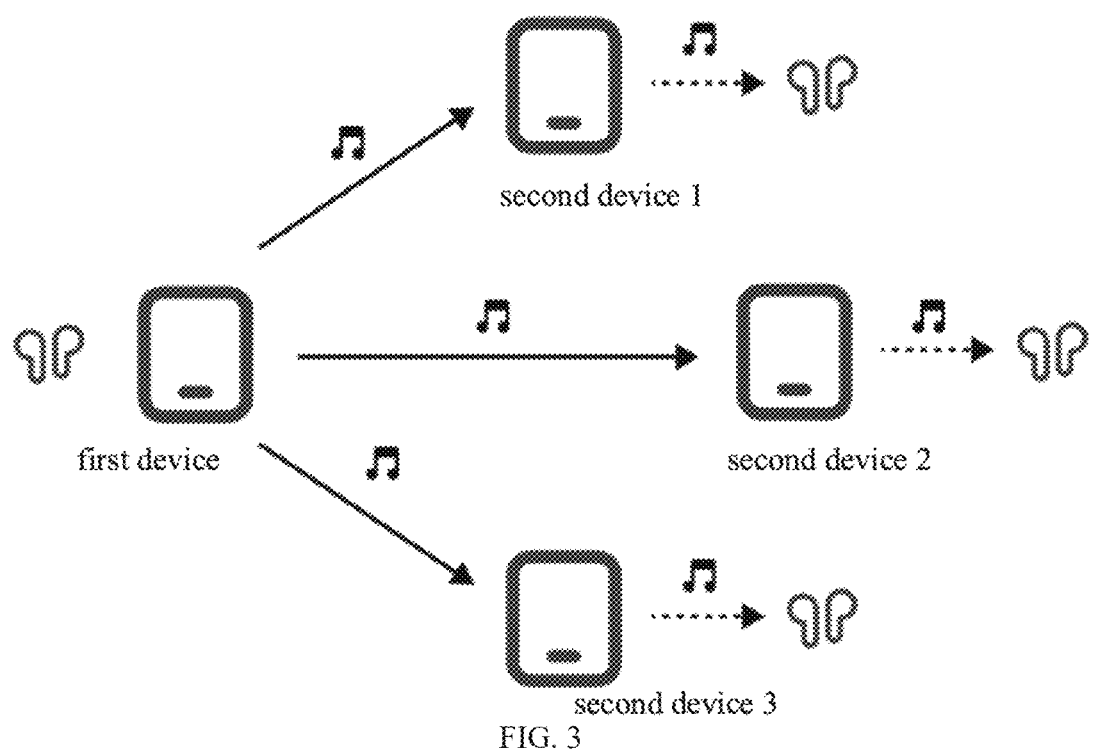
FIG. 3 is a schematic diagram of a connection between a first device and a second device according to another example of the disclosure.

In an example of the disclosure, as illustrated in FIG. 3, FIG. 3 is a schematic diagram of a connection between a first device and a second device according to another example of the disclosure. The connection may support sharing of audio streams between the first device and a plurality of second devices, and the first device and each of the second devices may be connected to a corresponding speaker device, respectively. In some possible examples, different devices may also be connected to different speaker devices for audio stream sharing function.

In the example, when one or more second devices exist in the scene where the first device is located, obtaining the second device location of the second device may include obtaining relative distance information and direction information between the second device and the first device as the second device location of the second device, or generating a location model combined with map application programs such as electronic maps, and obtaining location information of the second device by using the location model, or determining the second device location of the second device by means of location sharing, which is not limited.

Optionally, in the examples of the disclosure, a relative location between the second device location and a reference device location may be determined as the second device location. The relative location between the location of the second device (the location of the second device may be an actual geographic location of the second device in space) and the reference device location is determined as the second device location, which facilitates the recognition and management of the second device location, improves the accuracy of the location representation of the second device, and facilitates subsequent searching for the second device.

Optionally, in the example of the disclosure, the first device location may be determined as the reference device location. Since the first device location of the first device is determined as the reference device location, and the second device location is determined based on the first device location, the relative location between the first device and the second device may be effectively represented, so that the relative location between the first device and the second device is more intuitive and accurate.

The real geographic location of the pre-marked device in space may be called the reference device location. The reference device location may be used as a reference location when determining the first device location and the second device location, so as to effectively mark and display the location.

In the example of the disclosure, assuming that the first device is set as a center, the first device location of the first device is determined as the reference device location, and information (such as distance and direction) between the second device and the reference device is determined as the second device location. The second device location may represent the linear distance and orientation between the first device and the second device, which is not limited.

At S203, identification information of the second device is displayed on the first device based on the second device state information.

At S204, in response to receiving a sharing trigger request, an audio stream to be shared is sent to the second device based on the identification information of the second device.

For the description and explanation of S203 to S204, reference may be made to the foregoing examples, and details are not repeated here.

In the example, in response to receiving the sharing trigger request, the identification information of the second device is displayed on the first device in consideration of the second device location, so that it is convenient for the first device to rapidly search for the second device having the audio stream sharing needs, so as to realize the audio stream sharing. Therefore, the process of sharing the audio stream may be simplified, the convenience of the audio stream sharing operation is effectively improved, and the efficiency of sharing the audio stream and the sharing effect may be improved. In response to receiving the audio sharing request, the acquisition of the first device location of the first device may be directly triggered. The first device location is used to determine the second device capable of supporting the audio and video stream sharing function in the scene where the first device is located. In this way, it is possible to rapidly and conveniently obtain the relevant information of the second device that may support the audio and video stream sharing function in the scene where the first device is located, so that the first device may rapidly search for the second device having the audio stream sharing needs, to realize the audio stream sharing.

Figure 4:
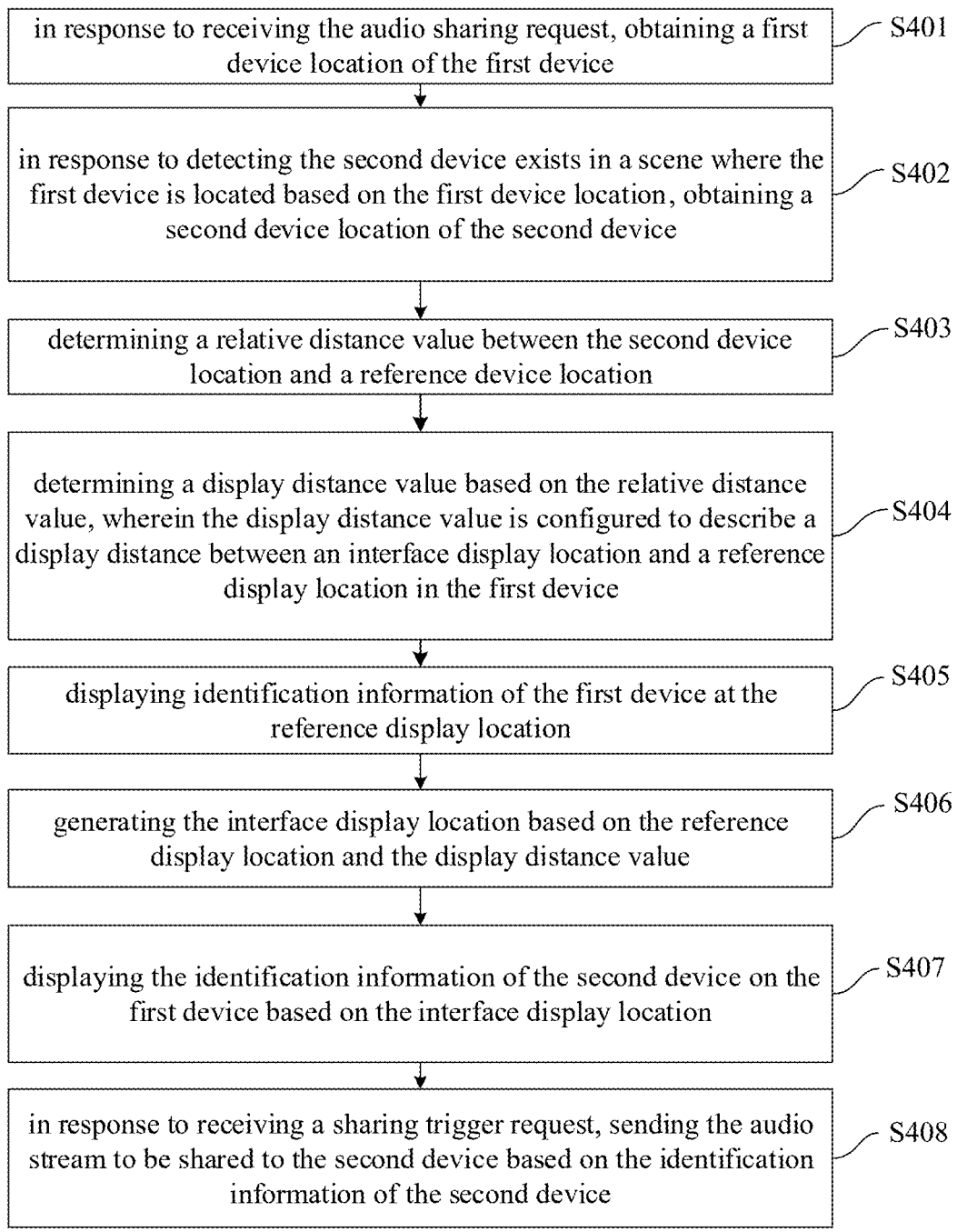
FIG. 4 is a schematic flowchart of a method for sharing an audio stream according to another example of the disclosure.

FIG. 4 is a schematic flowchart of a method for sharing an audio stream according to another example of the disclosure.

As illustrated in FIG. 4, the method for sharing an audio stream includes the following steps at S401-S408.

The method for sharing an audio stream in this example may be applied to the first device, and the first device initiates audio stream sharing to the second device.

At S401, in response to receiving the audio sharing request, a first device location of the first device is obtained.

At S402, in response to detecting the second device in a scene where the first device is located based on the first device location, the second device location of the second device is obtained.

For the description and explanation of S401 to S402, reference may be made to the foregoing examples, and details are not repeated here.

At S403, a relative distance value between the second device location and the reference device location is determined.

The linear distance value between the second device location and the reference device location may be referred to as the relative distance value, and the distance between the second device and the first device may be determined according to the relative distance value.

In the example of the disclosure, GPS is used to determine the distance between the second device and the first device, or Geographic Information System (GIS) may be used to determine the distance between the second device and the first device, or the distance between the second device and the first device may be determined based on signals of remote connection between the second device and the first device, which is not limited.

At S404, a display distance value is determined based on the relative distance value, in which the display distance value is configured to describe a display distance between the interface display location and a reference display location in the first device The location of the second device displayed on the display interface of the first device may be referred to as the interface display location. The interface display location may be used to indicate the relative location between the second device and the first device, such as distance and direction.

The display location serving as a reference on the display interface of the first device may be referred to as the reference display location. The reference display location may be a point in the display interface of the first device used to represent the first device location, or may also be a circle and a pattern, which is not limited.

In the example of the disclosure, different display distances are selected to describe the display distance values between the plurality of second devices and the first device respectively. Based on the display distance, the identification information of the corresponding second device is displayed on the display interface of the first device. Alternatively, a certain scale may also be set according to actual needs, and the display distance value between the first device and the second device may be converted by the scale, the identification information of the corresponding second device is displayed based on the converted proportional distance, which is not limited.

Optionally, in the example of the disclosure, when there are a plurality of second devices, the second devices include a plurality of relative distance values, a first variation relation exists among a plurality of display distance values, and a second variation relation exists among the relative distance values corresponding to the display distance values, and the first variation relation is positively correlated to the second variation relation. Since the display distance value may correspondingly describe the relative location relation between the first device and the second device in the physical space, the display of the relative location between the first device and the second device is more visualized, so that it is convenient for the user using the audio stream sharing function to intuitively know the relative location between the first device and the second device, and it is easy for the user to rapidly select the second device having the audio stream sharing needs.

In the display interface of the first device, the display distance value between the first device and the second device changes as the real relative distance value between the first device and the second device in the physical space varies. The change relation among different display distance values may be called the first variation relation. Correspondingly, the change relation among different relative distance values may be called the second variation relation. The first variation relation is positively correlated to the second variation relation.

For example, when the first device is a mobile phone and the second device is a speaker, the change relation among the relative distance values between the mobile phone and the speaker in the physical space may be the second variation relation. Correspondingly, the change relation among different display distance values between display locations of the speaker displayed on the screen of the mobile phone and the reference display location may be considered as the first variation relation. When the relative distance value between the speaker and the mobile phone in the physical space increases, the display distance value between the display location of the speaker displayed on the mobile phone screen and the reference display location may also increase. Moreover, when the relative distance value between the speaker and the mobile phone in the physical space decreases, the display distance value between the display location of the speaker displayed on the mobile phone screen and the reference display location may also decrease. It may be seen from the above that the first variation relation is positively correlated to the second variation relation.

That is, by configuring the first variation relation among the plurality of display distance values, and the second variation relation among the relative distance values corresponding to the display distance values, and the first variation relation is positively correlated to the second variation relation, the comparison result of the relative distance values between the location of each second device and the first device location may be clearly displayed in the display interface of the first device, thus improving the degree of clarity of displaying the second device locations.

In the example of the disclosure, the display distance value and the relative distance value are processed according to a certain ratio. When the relative distance value increases or decreases, the display distance value also increases or decreases correspondingly according to the ratio, the changed display distance value is displayed on the display interface of the first device, and the scanning of one or more second devices is completed by the first device. Alternatively, multiple display distance values may be set in advance, when the relative distance value between the second device and the first device increases or decreases to a certain degree, the corresponding display distance value is selected to represent the distance between the first device and the second device in the physical space.

At S405, identification information of the first device is displayed at the reference display location.

The information for uniquely identifying the first device may be referred to as the identification information of the first device. The identification information of the first device may be, for example, a nickname of an application program that plays the audio stream in the first device, and communication link information of the first device, which is not limited.

In the example of the disclosure, the identification information of the first device, such as the nickname of the application program that plays the audio stream in the first device, and the communication link information of the first device, may be displayed at the reference display location in the display interface of the first device. Alternatively, the identification information of the first device may also be displayed at any other possible location on the display interface of the first device, which is not limited.

At S406, an interface display location is generated based on the reference display location and the display distance value.

The display location for displaying information such as the logo and icon of the second device in the display interface of the first device, may be called the interface display location. The identification information of one or more second devices may be displayed at the interface display location.

In the example of the disclosure, the interface display location may be preset in the display interface of the first device based on the reference display location and the display distance value.

For example, assuming that the reference display location is set as a center, the identification information of the corresponding second device may be distributed and displayed around the reference display location according to the display distance value. Alternatively, assuming that the identification information of the nearest second device is set as a center, the identification information of other second devices is distributed around the identification information of the nearest second device according to the display distance value, which is not limited.

Figure 5:
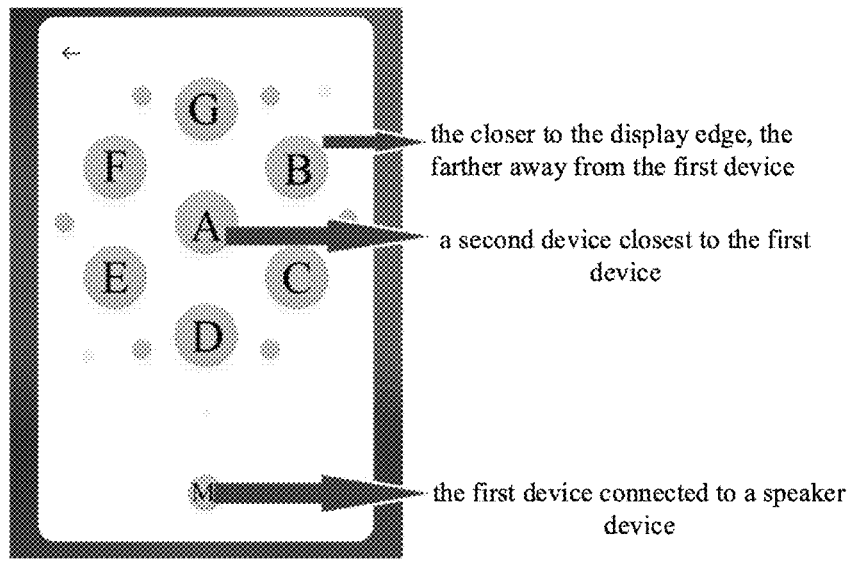
FIG. 5 is a schematic diagram of an interface display according to another example of the disclosure.

For example, as illustrated in FIG. 5, FIG. 5 is a schematic diagram of an interface display according to another example of the disclosure. In FIG. 5, the identification information "M" of the first device is displayed at the bottom of the display interface, assuming that the identification information "A" of a second device closest to the first device is a center point, the closer to the display edge, the farther the corresponding second device is from "M".

At S407, the identification information of the second device is displayed on the first device based on the interface display location.

In the example of the disclosure, displaying the identification information of the second device on the display interface of the first device according to the interface display location may include displaying identification information of the corresponding second device, and viewing other identification information of the corresponding second device by clicking the identification information of the corresponding second device, or may include directly listing all the identification information of the second device and displaying them at the corresponding interface display locations, which is not limited.

At S408, in response to receiving an audio sharing request, an audio stream to be shared is sent to the second device based on the identification information of the second device.

The description and explanation of S408 may refer to the foregoing example for details, and details are not repeated here.

In the example, since in response to receiving the sharing trigger request, the identification information of the second device is displayed on the first device in consideration of the second device location, so that it is convenient for the first device to rapidly search for the second device having the audio stream sharing needs, so as to realize the audio stream sharing. Therefore, the process of sharing the audio stream may be simplified, the convenience of the audio stream sharing operation may be effectively improved, and the efficiency of sharing the audio stream and the sharing effect may be improved. Since the interface display location is generated according to the reference display location and the display distance value, the interface display location in the first device for displaying the relevant description information of the second device may be rapidly and accurately determined. Since the identification information of the second device is displayed on the first device according to the interface display location, the corresponding identification information of the second devices may be displayed more intuitively, thus effectively improving the convenience for the user to obtain the identification information of the second device. Since the identification information of the first device is displayed at the reference display location, it is convenient for the user to recognize the identification information of the first device and to view the identification information of the first device and the second device at the same time.

Figure 6:
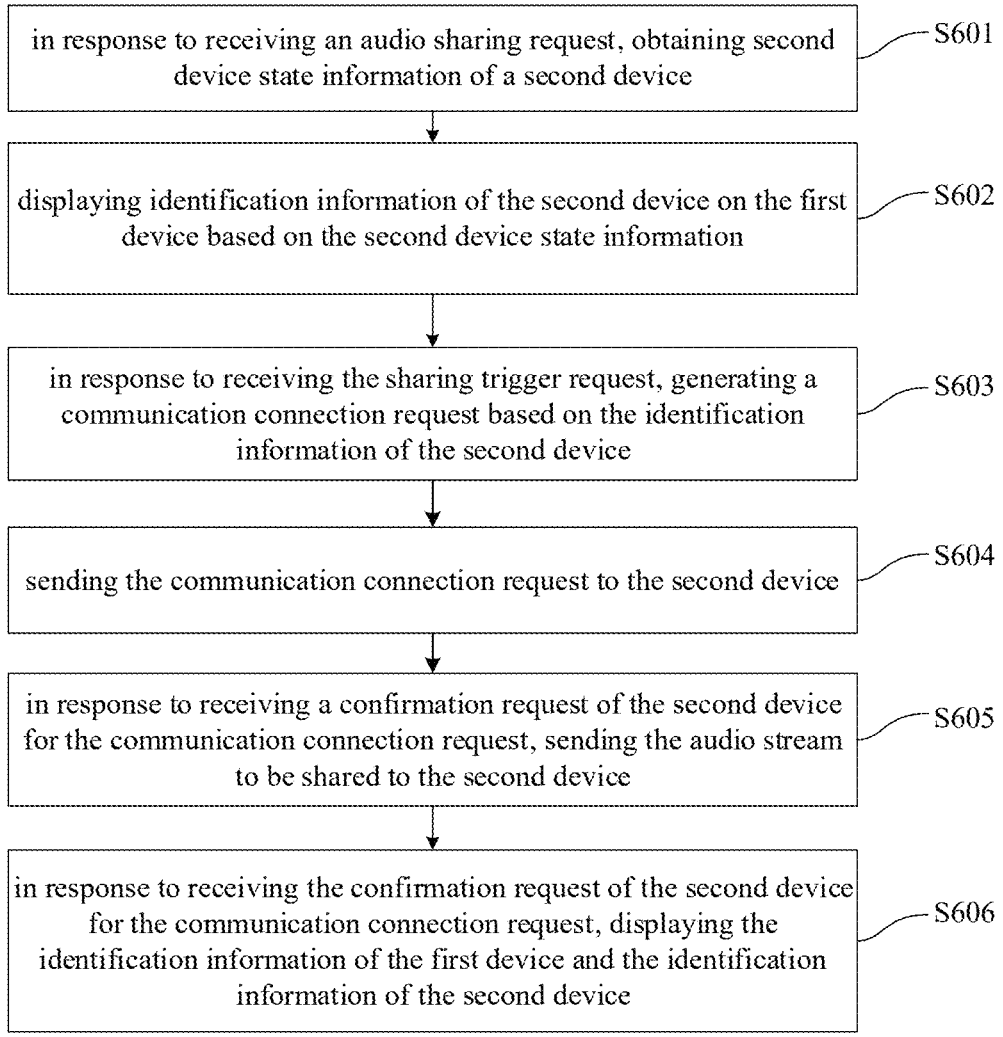
FIG. 6 is a schematic flowchart of a method for sharing an audio stream according to another example of the disclosure.

FIG. 6 is a schematic flowchart of a method for sharing an audio stream according to another example of the disclosure.

As illustrated in FIG. 6, the method for sharing an audio stream includes the following steps at S601-S606.

The method for sharing an audio stream in this example may be applied to the first device, and the first device initiates audio stream sharing to the second device.

At S601, in response to receiving an audio sharing request, second device state information of a second device is obtained.

At S602, identification information of the second device is displayed on the first device based on the second device state information.

For the description and explanation of S601 to S602, reference may be made to the foregoing examples, and details are not repeated here.

At S603, in response to receiving the sharing trigger request, a communication connection request is generated based on the identification information of the second device.

The request information for requesting a connection and performing the audio stream sharing may be referred to as the communication connection request. The communication connection request may be used to request an audio stream transmission connection with one or more second devices.

In the example of the disclosure, one or more second devices corresponding to the identification information of the second device are selected based on the sharing trigger request. The communication connection request is generated, and the communication connection request may include information related to the audio stream, such as, the identifier of the audio stream, and the duration of the audio stream, which is not limited.

At S604, the communication connection request is sent to the second device.

In the example of the disclosure, one or more second devices to be connected may be selected on the display interface of the first device, and the communication connection request may be sent to the one or more second devices. The second device to be sent is selected by clicking on the identification information of the second devices displayed on the display interface of the first device, or it is possible to set selection conditions to filter one or more second devices that meet the needs such as distance and location, and send the communication connection request to the corresponding second device.

At S605, in response to receiving a confirmation request of the second device for the communication connection request, the audio stream to be shared is sent to the second device.

The request information sent by the second device to confirm the communication connection request of the first device may be referred to as the confirmation request. The confirmation request may be used to indicate that the second device agrees to perform an audio stream sharing connection with the first device.

In the example of the disclosure, the first device may add an option to confirm the request in the communication connection request, and the second device receives the communication connection request, parses and selects the corresponding option, to agree or disagree the audio stream sharing with the first device. Alternatively, the second device may choose to generate a corresponding confirmation request after the communication connection request is received, which is not limited.

In the example of the disclosure, after the communication connection request is sent to the one or more corresponding second devices, the first device may continue to monitor the detection of the confirmation request sent by the second device. After detecting the confirmation request, the first device is connected to the corresponding second device, and the audio stream to be shared is sent to the second device.

In the example of the disclosure, sending the communication connection request to the second device may include: sending the communication connection request to the second device by the Bluetooth module of the first device, or sending the communication connection request to the second device by the wireless communication technology Wi-Fi, or sending the communication connection request to the second device by any other possible manners, which is not limited.

At S606, in response to receiving the confirmation request of the second device for the communication connection request, both the identification information of the first device and the identification information of the second device are jointly displayed.

In the example of the disclosure, the identification information of the connected first device and the identification information of the connected second device may be jointly displayed, and the identification information of the second device that has realized the audio stream sharing connection with the first device may be displayed on the corresponding display interface of the first device.

Figure 7:
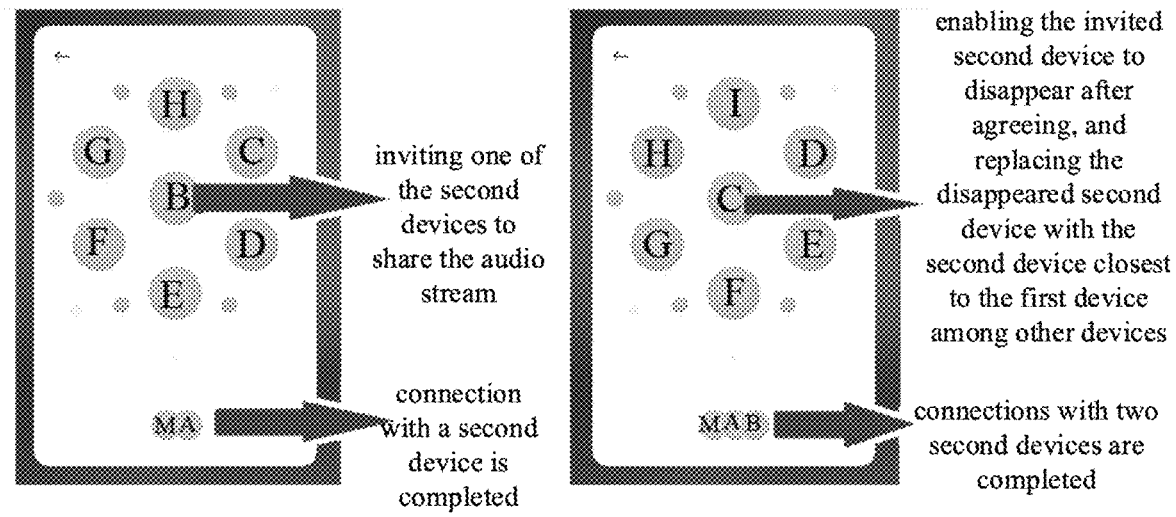
FIG. 7 is a schematic diagram of a joint display according to another example of the disclosure.

For example, as illustrated in FIG. 7, FIG. 7 is a schematic diagram of a joint display according to the example of the disclosure. In FIG. 7, the identification information "A" of the second device, that has completed the audio stream sharing connection with the first device, is displayed behind the identification information "M" of the first device, and the identification information "B" of the second device, that has completed the audio stream sharing connection with the first device, may be also displayed behind the identification information "M" of the first device. At this time, the display interface of the first device is updated, in which the pieces of identification information of other second devices (except the second device that has been connected) are rearranged according to the display distance values. At the same time, the connected second devices may be managed on the audio stream interface, which is not limited.

In this example, since the audio stream to be shared is sent to the second device based on the communication connection request and the confirmation request of the second device for the communication connection request, which effectively improving the matching accuracy between the first device and the second device, and effectively improving the efficiency of the audio stream sharing connection. Since the identification information of the first device and the identification information of the second device are displayed jointly, the confirmation on the identification information of the connected second device may be more intuitively, and it is convenient to check the connection state of one or more second devices connected, which facilitates the recognition and management of multiple second devices.

Figure 8:
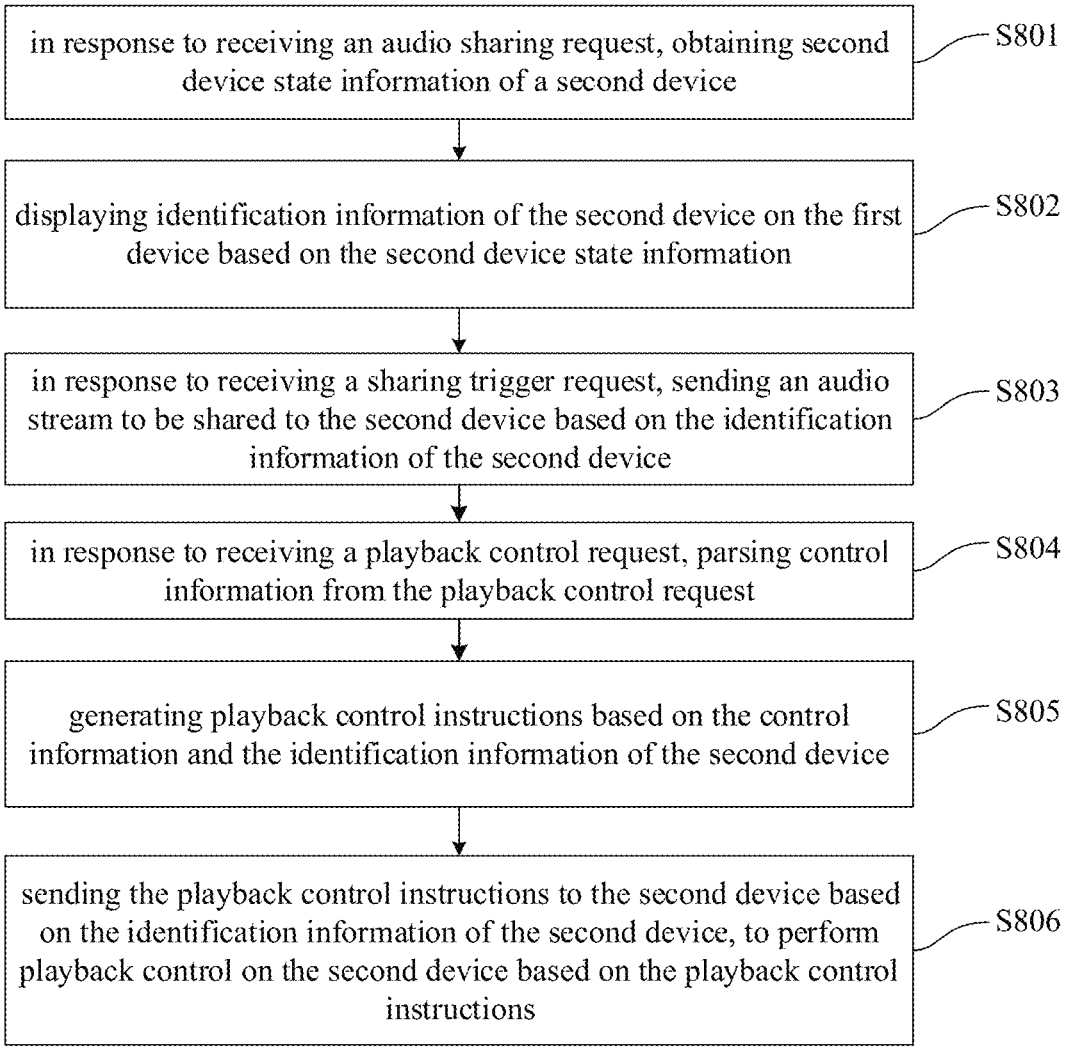
FIG. 8 is a schematic flowchart of a method for sharing an audio stream according to another example of the disclosure.

FIG. 8 is a schematic flowchart of a method for sharing an audio stream according to another example of the disclosure.

As illustrated in FIG. 8, the method for sharing an audio stream includes the following steps S801-S806.

The method for sharing an audio stream in this example may be applied to the first device, and the first device initiates audio stream sharing to the second device.

At S801, in response to receiving an audio sharing request, second device state information of a second device is obtained.

At S802, identification information of the second device is displayed on the first device based on the second device state information.

At S803, in response to receiving a sharing trigger request, an audio stream to be shared is sent to the second device based on the identification information of the second device.

For the description and explanation of S801 to S803, reference may be made to the foregoing examples, and details are not repeated here.

At S804, in response to receiving a playback control request, control information is parsed from the playback control request.

The request information for controlling one or more connected second devices to play the audio stream may be called the playback control request. The playback control request sent by the first device may include data information for controlling the second device to play the audio stream, and the data information may be referred to as the control information.

In the example of the disclosure, the playback control request may include control information for controlling the second device to play the audio stream. The second devices may correspond to matching a plurality of playback control requests, or one playback control request may be used to control the second devices, to implement flexible control of the second devices, which is not limited.

At S805, playback control instructions are generated based on the control information and the identification information of the second device.

The instruction information used to control the second device to play the audio stream may be referred to as the playback control instructions. The playback control instructions may be used to control the corresponding second device to display the audio stream and adjust information such as the volume.

In the example of the disclosure, the control information in the playback control request may be matched with the identification information of the corresponding second devices respectively, to generate a plurality of playback control instructions corresponding to the second devices, or one piece of control information may be matched with the second devices to implement unified control of the second devices, which is not limited.

Figure 9:
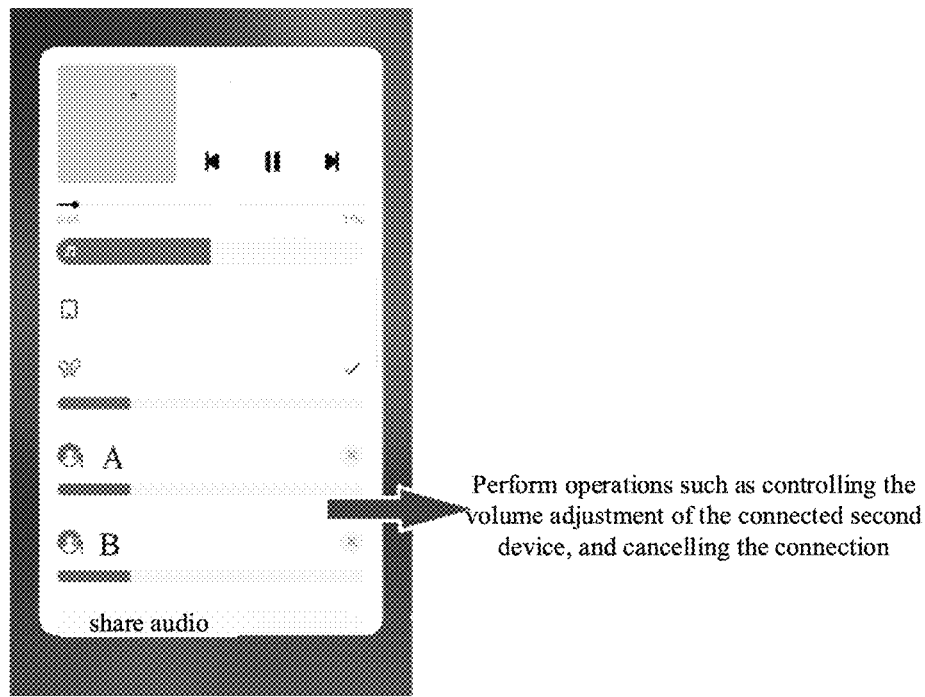
FIG. 9 is a schematic diagram of a control display according to another example of the disclosure.

For example, as illustrated in FIG. 9, FIG. 9 is a schematic diagram of a control interface according to another example of the disclosure. The first device may control the operations on the connected second device based on the control interface, such as, volume adjustment and connection cancellation.

At S806, the playback control instructions are sent to the second device based on the identification information of the second device, playback control on the second device is performed based on the playback control instructions.

In the example of the disclosure, a wireless transmission method such as Bluetooth or wireless communication technology Wi-Fi may be used to send the playback control instructions to a plurality of corresponding second devices. The second devices receive and parse the playback control instructions to obtain the control information in the playback control instructions, playback control on the second devices is thus performed.

In the example, in response to receiving the audio sharing request, the second device state information of the second device is obtained. The identification information of the second device is displayed on the first device according to the second device state information. In response to receiving the sharing trigger request, the audio stream to be shared is sent to the second device according to the identification information of the second device. In response to receiving the playback control request, the control information is parsed from the playback control request. The playback control instructions are generated according to the control information and the identification information of the second device. The playback control instructions are sent to the second device according to the identification information of the second device, so that the playback control is performed on the second device based on the playback control instructions. Since the playback control instructions are generated according to the playback information and the identification information of the second device, to control the playback of the second device, different control operations for different second devices are supported, which may improve the flexibility and control effect of the second devices.

Figure 10:
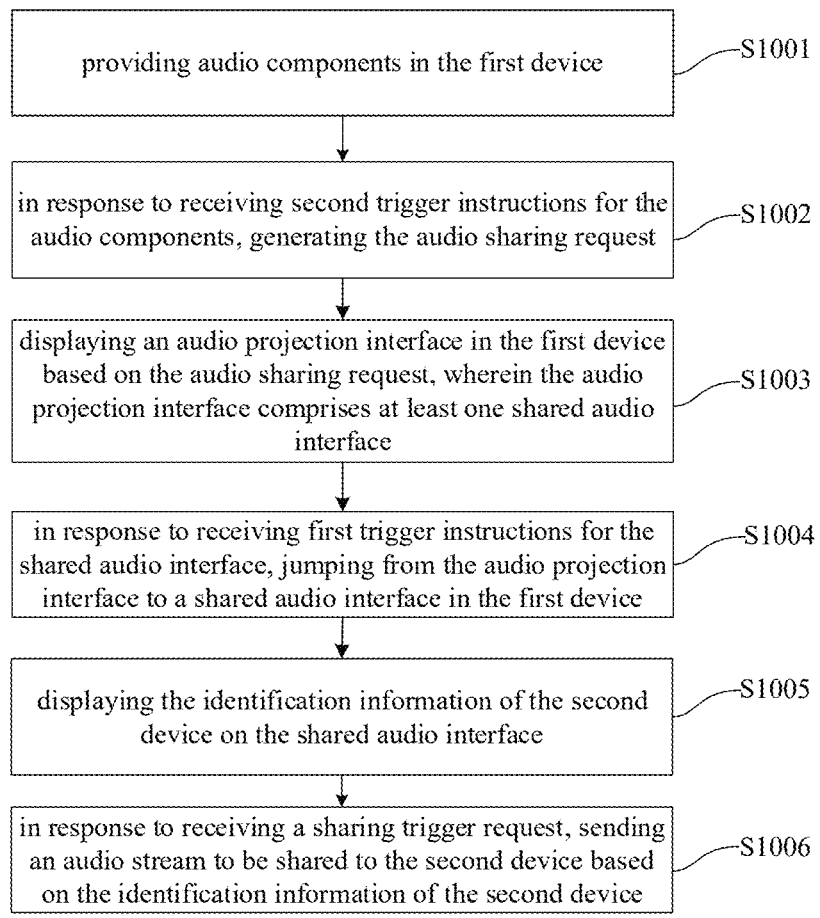
FIG. 10 is a schematic flowchart of a method for sharing an audio stream according to another example of the disclosure.

FIG. 10 is a schematic flowchart of a method for sharing an audio stream according to another example of the disclosure.

As illustrated in FIG. 10, the method for sharing an audio stream includes the following steps at S1001-S1006.

The method for sharing an audio stream in this example may be applied to the first device, and the first device initiates audio stream sharing to the second device.

At S1001, audio components are provided in the first device.

The components that implement audio playback, audio stream processing and transmission may be called the audio components. The audio components may be applications used to manage and play audio stream data, software used to manage and play audio stream data, or code embedded in other applications, which is not limited.

In the example of the disclosure, if it is detected and determined that the first device is connected to the speaker device, the audio components are provided in the first device. Since the audio components are provided in the first device connected to the speaker device, it is convenient to match the speaker device, thus achieving stable playback of the audio stream.

In the example of the disclosure, when the first device is connected to the speaker device, or one or more speaker devices to be operated is selected from the multiple connected speaker devices, it means that the first device has been connected to the speaker device, which is not limited.

For example, when the first device is a mobile phone, a speaker of the mobile phone may be connected as the speaker device, or an external device such as an earphone and a sound device may also be connected as the speaker device, which is not limited.

In the example of the disclosure, providing the audio components in the first device may include providing the audio components in a control center of the first device, or adding program software for third-party audio components to the first device, or adding hardware devices corresponding to the audio components to the first device, which is not limited.

In the example of the disclosure, the audio components may be provided in the control center of the first device. Since the audio components are added to the control center of the first device, the processing and response speed of the audio components are improved, which facilitates the management of the audio components.

In the example of the disclosure, the control center of the first device may be the Central Processing Unit (CPU) of the first device, or processing chips or processing modules for managing the audio components, which is not limited.

At S1002, in response to receiving second trigger instructions for the audio components, the audio sharing request is generated.

The instruction data used to trigger the audio components of the first device for implementing the audio stream sharing may be referred to as the second trigger instructions. The second trigger instructions may be generated by the control center of the first device for triggering the audio components to generate the audio sharing request.

In the example of the disclosure, the second trigger instructions may be generated when the user performs a sharing operation on the audio stream in the first device, to trigger the audio components and to generate the audio sharing request. Alternatively, when connecting to the second device according to the sharing needs in the actual scene, the control center of the first device automatically generates the second trigger instructions to trigger the generation of the audio sharing request. Alternatively, any other possible implementation manner responds to the second trigger instructions and generates the audio sharing request, which is not limited.

At S1003, an audio projection interface is displayed in the first device based on the audio sharing request, in which the audio projection interface includes at least one shared audio interface.

The display interface used to display the audio stream information, the identification information of the first device, and the identification information of the second device, may be called the audio projection interface. The audio projection interface may be generated and displayed in the first device, or may be projected to the display interface of the second device. The interface included in the shared audio interface may be called the shared audio interface, and the shared audio interface may be used to jump to the display interface for displaying the identification information of the second device, which is not limited.

In the example of the disclosure, the first device may organize and generate the audio projection interface according to information such as the audio stream to be shared, the identification information of the first device, and the identification information of the second device.

In the example of the disclosure, when generating the audio projection interface, a program for indicating the audio projection interface template in the first device may be adopted, or a third-party application program having the audio projection function may be selected, which is not limited.

In the example of the disclosure, when the second device has a display interface, according to the display interface of the second device, the audio projection interface is projected to the second device. The projected audio projection interface may be adjusted so as to adapt different display interfaces of the second device, and the contents in the audio projection interface may also be selectively displayed, which is not limited.

Figure 11:
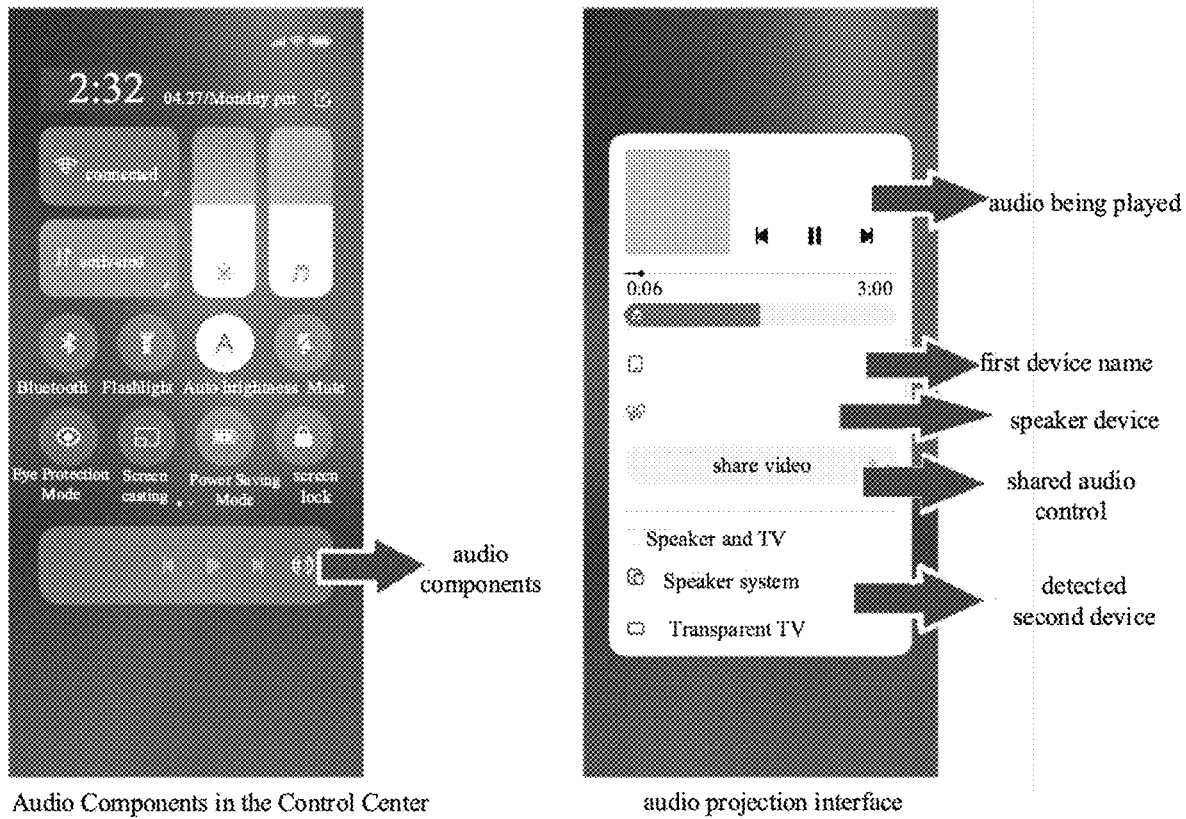
FIG. 11 is a schematic diagram of a first device interface according to another example of the disclosure.

For example, when the first device is a mobile phone and the audio components are provided in a control center of the mobile phone, as illustrated in FIG. 11, FIG. 11 is a schematic diagram of a first device interface according to another example of the disclosure, both audio components of the control center and the audio projection interface may be added to the display interface of the mobile phone. The audio projection interface includes display data such as the audio being played, the name of the first device, the speaker device connected to the first device, a shared audio control and the detected second devices (such as an audio system, a TV, and a mobile phone).

At S1004, in response to receiving first trigger instructions for the shared audio control, it jumps from the audio projection interface to a shared audio interface on the first device.

The instruction information for triggering the display interface of the first device to jump from the displayed audio projection interface to the shared audio interface may be referred to as the first trigger instructions. The first trigger instructions may be generated when the user triggers the shared audio interface, or when the connected second device is detected, the first trigger instructions may be generated, and the display interface is controlled to jump to the displayed shared audio interface, which is not limited.

The display interface for displaying identification information of the second device may be called the shared audio interface. The shared audio interface may include identification information of the second device and the identification information of the first device, which is not limited.

In the example of the disclosure, when the first trigger instructions are received, the display interface of the first device jumps from the displayed audio projection interface to the displayed shared audio interface, and the first trigger instructions may be used to control the jumping of the display interface.

At S1005, the identification information of the second device is displayed on the shared audio interface.

In the example of the disclosure, according to the display distance values, pieces of the identification information of multiple second devices that are detected to be connected are displayed in the shared audio interface, or information such as the identification information of the second device and the distance to the second device may also be displayed on the shared audio interface of the first device, which is not limited.

Figure 12:
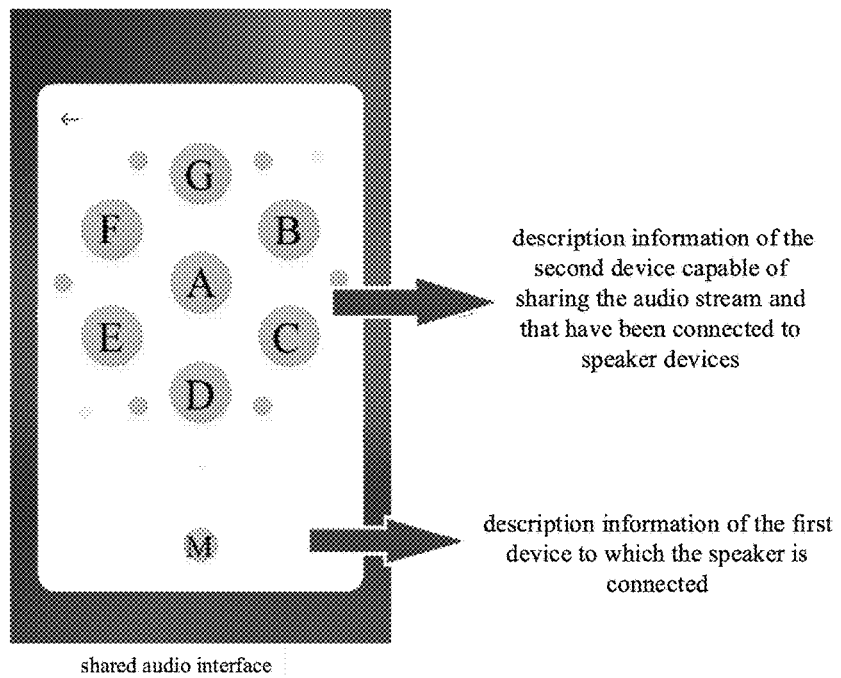
FIG. 12 is a schematic diagram of a shared audio interface according to another example of the disclosure.

For example, as illustrated in FIG. 12, FIG. 12 is a schematic diagram of a shared audio interface according to another example of the disclosure. The shared audio interface includes identification information of some second devices capable of sharing the audio stream and that have been connected to speaker devices, such as, "A", "B", "C", and the identification information "M" of the first device connected to the speaker device.

At S1006, in response to receiving a sharing trigger request, an audio stream to be shared is sent to the second device based on the identification information of the second device.

The description of S1006 may refer to the above-mentioned examples for details, and details are not repeated here.

In the example, the audio components are provided in the first device. In response to receiving the second trigger instructions for the audio components, the audio sharing request is generated. In response to receiving the audio sharing request, the audio projection interface is displayed in the first device, and the audio projection interface includes a shared audio control. In response to receiving the first trigger instructions for the shared audio control, the first device jumps from the audio projection interface to the shared audio interface. The identification information of the second device is displayed on the shared audio interface. In response to receiving the sharing trigger request, the audio stream to be shared is sent to the second device based on the identification information of the second device. The audio components are used to generate the audio sharing request for sharing the audio streams, the connection and management of the second device may be controlled through the audio components, thus effectively improving the connection speed of the second device and the convenience of the connection management of the second device. In response to receiving the first trigger instructions, the first device is controlled to jump from displaying the audio projection interface to displaying the shared audio interface, which may improve the convenience of management of the display interface of the first device and reduce the user's learning start level.

Figure 13:
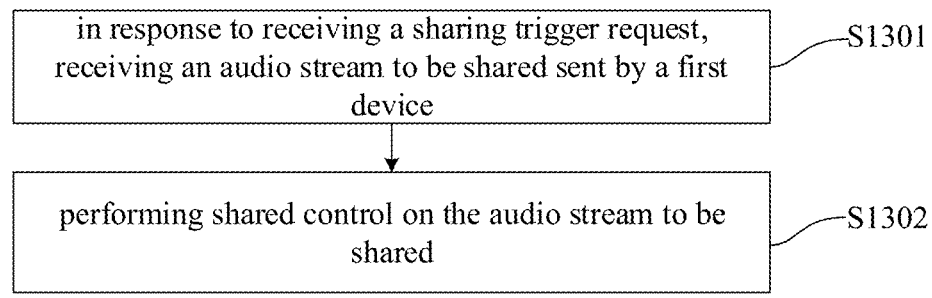
FIG. 13 is a schematic flowchart of a method for sharing an audio stream according to an example of the disclosure.

FIG. 13 is a schematic flowchart of a method for sharing an audio stream according to an example of the disclosure.

As illustrated in FIG. 13, the method for sharing an audio stream includes the following steps at S1301-S1302.

The method for sharing an audio stream in this example may be applied to the second device, and the second device receives the shared audio stream sent by the first device.

At S1301, in response to receiving a sharing trigger request, an audio stream to be shared sent by a first device is received.

In the example of the disclosure, after the second device receives the sharing trigger request sent by the first device using the wireless communication technology, the second device parses the sharing trigger request, generates a confirmation request and sends the request to the first device, so that a connection between the second device and the first device for audio stream sharing is completed, and the audio stream to be shared sent by the first device is received.

At S1302, shared control is performed on the audio stream to be shared.

In the example, after the audio stream to be shared is received, the second device may play the audio stream to be shared, or adjust a volume level and a playback progress of the audio stream to be shared, which is not limited.

In the example, in response to receiving the sharing trigger request, the audio stream to be shared sent by the first device is received, and the shared control of the audio stream to be shared is performed. Since the second device is obtained by the first device when searching for devices having audio stream sharing needs based on the identification information of the second device, the process of sharing the audio stream is simplified, thus effectively improving the convenience for sharing the audio stream, and improving the efficiency of sharing the audio stream and the sharing effect.

Figure 14:
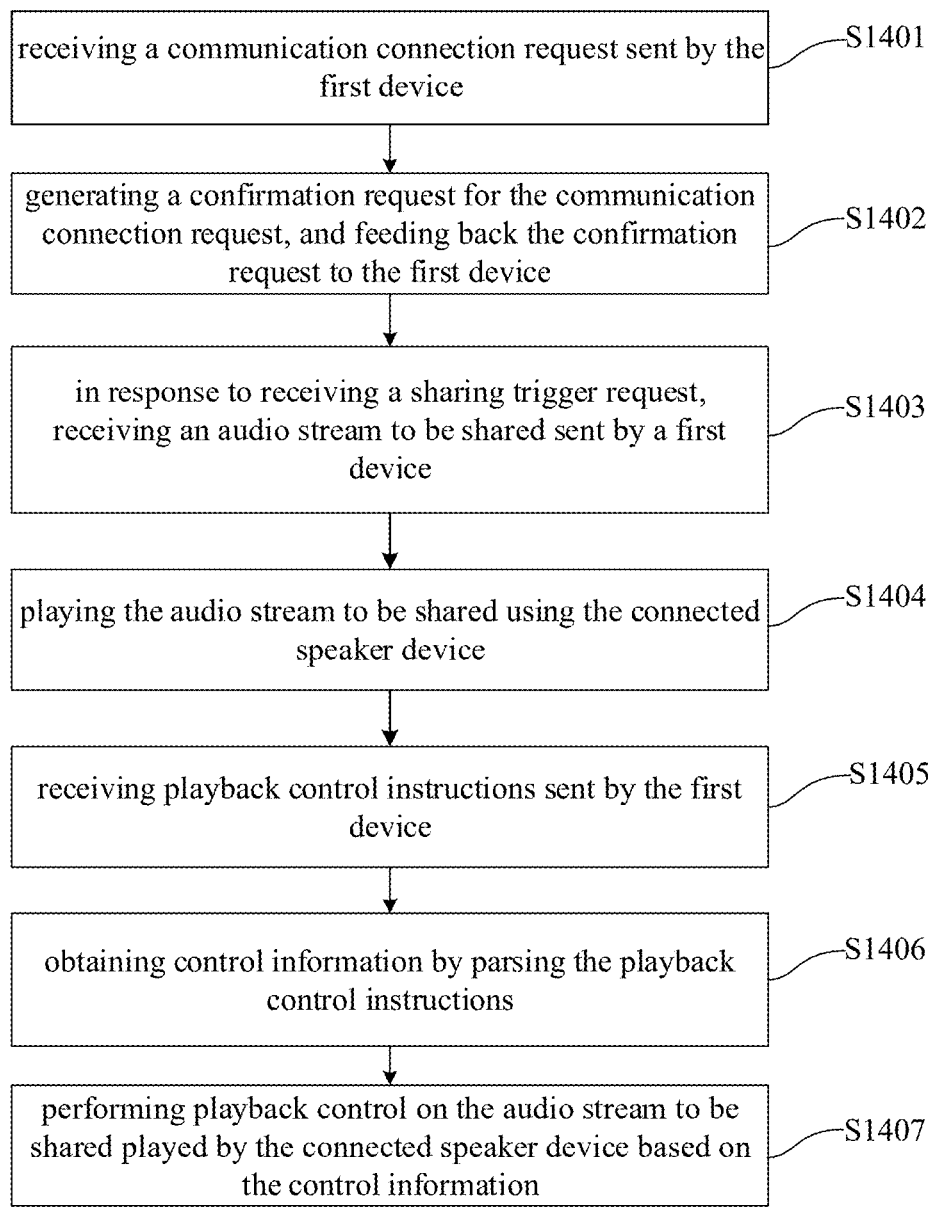
FIG. 14 is a schematic flowchart of a method for sharing an audio stream according to another example of the disclosure.

FIG. 14 is a schematic flowchart of a method for sharing an audio stream according to another example of the disclosure.

As illustrated in FIG. 14, the method for sharing an audio stream includes the following steps at S1401-S1407.

The method for sharing an audio stream in this example may be applied to the second device, and the second device receives the shared audio stream sent by the first device.

At S1401, a communication connection request sent by the first device is received.

In the example of the disclosure, receiving the communication connection request sent by the first device may include the second device receiving the communication connection request sent by the first device using Bluetooth, or receiving the communication connection request sent by the first device using wireless communication technology, or receiving the communication connection request sent by the first device using any other possible implementation, which is not limited.

At S1402, a confirmation request for the communication connection request is generated, and the confirmation request is fed back to the first device.

In the example of the disclosure, the second device parses connection information in the communication connection request (e.g., the identification information of the first device, and audio stream connection), and confirms whether to connect with the first device for audio stream sharing. When the connection is confirmed, the confirmation request may be generated and fed back to the first device, or a "yes" option on the interface may be selected for confirmation on initiating the connection in the communication connection request, and may be fed back to the first device as the confirmation request, which is not limited.

Figure 15:
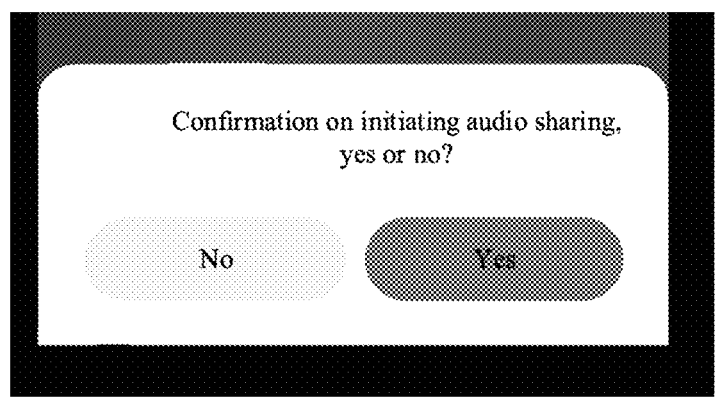
FIG. 15 is a schematic diagram of confirmation request feedback according to another example of the disclosure.

For example, as illustrated in FIG. 15, FIG. 15 is a schematic diagram of a confirmation request feedback interface according to another example of the disclosure. When the option "yes" is selected, it may indicate that a confirmation request is sent to the first device, and when the option "no" is selected, a refusal request is sent to the first device, which represents that the second device refuses to share the audio stream with the first device.

At S1403, in response to receiving a sharing trigger request, an audio stream to be shared sent by a first device is received.

The description and explanation of S1403 may refer to the above-mentioned examples for details, and details are not repeated here.

At S1404, the audio stream to be shared is displayed using the connected speaker device.

In the example of the disclosure, after the audio stream to be shared sent by the first device is received, the second device may be managed by the first device to play the audio stream to be shared, or the second device may choose to play the audio stream to be shared independently, or the second device sends a play request to the first device, and the audio stream to be shared is played after the play request sent by the first device is received, which is not limited.

At S1405, playback control instructions sent by the first device are received.

In the example of the disclosure, receiving the playback control instructions sent by the first device may include receiving the playback control instructions sent by the first device using Bluetooth, or receiving the playback control instructions sent by the first device using the wireless transmission technology, or receiving the playback control instructions sent by the first device using any other possible implementation, which is not limited.

In the example, the second device may authorize the first device to control a speaker device and an audio component corresponding to the second device by receiving the playback control instructions sent by the first device, so as to realize the audio stream sharing.

At S1406, control information is obtained by parsing the playback control instructions.

The data information for controlling the audio components or the speaker device of the second device may be called the control information. The control information may be parsed from the playback control instructions. The control information includes information on controlling a volume level, playback nodes, a playback progress for the speaker device, and a connection state of the second device. Therefore, the control information is configured to control the second device.

In the example, after the playback control instructions sent by the first device are received, the control information may be obtained by parsing in a processing center of the second device, or the playback control instructions may be parsed by a preset parsing program to obtain the control information, which is not limited.

At S1407, playback control of the audio stream to be shared played by the connected speaker device is performed based on the control information.

In the example of the disclosure, performing playback control on the audio stream to be shared played by the connected speaker device based on the control information may include adjusting a volume level, adjusting a playback progress, continuing/pausing playback, determining whether to enable/disable the connection between the first device and the second device, which is not limited.

In the example of the disclosure, in response to receiving the communication connection request sent by the first device, the confirmation request for the communication connection request is generated and sent to the first device. In response to receiving the sharing trigger request, the audio stream to be shared sent by the first device is received. The audio stream to be shared is played using the connected speaker device. After the playback control instructions sent by the first device are received, the control information is obtained by parsing the playback control instructions. Then, playback control is performed on the audio stream to be shared played by the connected speaker device based on the control information. Since the connection between the first device and the second device is realized according to the confirmation request fed back after the communication connection request sent by the first device is received, the connection efficiency may be effectively improved. Since the device that has been connected to the speaker device in the scene where the first device is located is determined as the second device, interference on the search of the second device caused by other devices that are not connected to the speaker device may be effectively avoided, which greatly improves the efficiency of scanning and confirming the relevant information of the second device, and effectively improves the efficiency of sharing the audio stream. Since the control information parsed from the playback control instructions is used to control the playback of the audio stream to be shared that is played by the connected speaker device, the playback management effect of the first device on the connected second device may be enhanced, which effectively improves the consistency of playback of the audio stream to be shared, improves the audio stream playback effect, and facilitates the sharing and management of audio streams.

Figure 16:
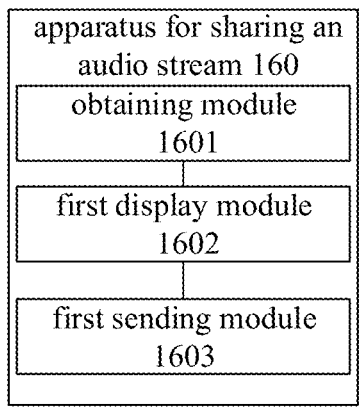
FIG. 16 is a structural schematic diagram of an apparatus for sharing an audio stream according to an example of the disclosure.

FIG. 16 is a structural schematic diagram of an apparatus for sharing an audio stream according to an example of the disclosure.

As illustrated in FIG. 16, the apparatus for sharing an audio stream 160 is applicable to the first device. The apparatus includes: an obtaining module 1601, a first displaying module 1602 and a first sending module 1603.

The obtaining module 1601 is configured to, in response to receiving an audio sharing request, obtain second device state information of a second device.

The first displaying module 1602 is configured to display identification information of the second device on the first device based on the second device state information.

The first sending module 1603 is configured to, in response to receiving a sharing trigger request, send an audio stream to be shared to the second device based on the identification information of the second device.

Figure 17:
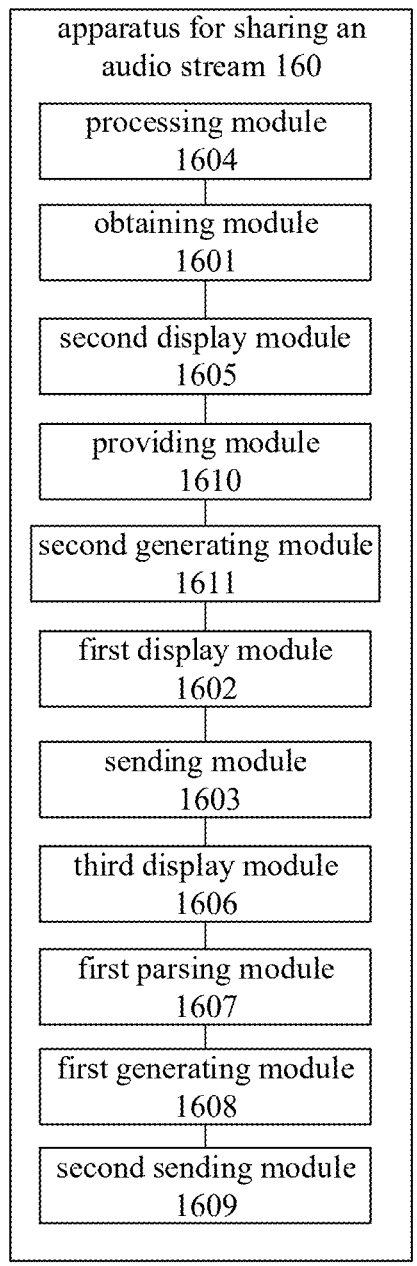
FIG. 17 is a structural schematic diagram of an apparatus for sharing an audio stream according to another example of the disclosure.

In some examples of the disclosure, as illustrated in FIG. 17, FIG. 17 is a structural schematic diagram of an apparatus for sharing an audio stream according to another example of the disclosure. The obtaining module 1601 is further configured to:

obtain a second device location of the second device, and determine the second device location as the second device state information; and The first displaying module 1602 is further configured to: display the identification information of the second device on the first device based on the second device location.

In some examples of the disclosure, as illustrated in FIG. 17, the obtaining module 1601 is further configured to:

in response to receiving the audio sharing request, obtain a first device location of the first device; and in response to detecting the second device in a scene where the first device is located based on the first device location, obtain the second device location of the second device.

In some examples of the disclosure, as illustrated in FIG. 17, the obtaining module 1601 is further configured to:

determine a scanning location area based on the first device location; and in response to detecting a device connected to a speaker device in the scanning location area, determine the device connected to the speaker device as the second device.

In some examples of the disclosure, as illustrated in FIG. 17, the obtaining module 1601 is further configured to:

determine a relative location between the second device location and a reference device location as the second device location.

In some examples of the disclosure, as illustrated in FIG. 17, the apparatus further includes:

a processing module 1604, configured to, before determining the relative location between the second device location and the reference device location as the second device location, determine the first device location as the reference device location.

In some examples of the disclosure, as illustrated in FIG. 17, the first displaying module 1602 is further configured to:

determine an interface display location based on the second device location; and display the identification information of the second device on the first device based on the interface display location.

In some examples of the disclosure, as illustrated in FIG. 17, the first displaying module 1602 is further configured to:

determine a relative distance value between the second device location and the reference device location;

determine a display distance value based on the relative distance value, in which the display distance value is configured to describe a display distance between the interface display location and a reference display location in the first device; and generate the interface display location based on the reference display location and the display distance value.

In some examples of the disclosure, as illustrated in FIG. 17, in which, in response to determining that a plurality of second devices exist, the second devices include a plurality of relative distance values, a first variation relation exists among a plurality of display distance values, a second variation relation exists among the relative distance values corresponding to the display distance values, and the first variation relation is positively correlated to the second variation relation.

In some examples of the disclosure, as illustrated in FIG. 17, the apparatus further includes:

a second displaying module 1605, configured to, before generating the interface display location based on the reference display location and the display distance value, display identification information of the first device at the reference display location.

In some examples of the disclosure, as illustrated in FIG. 17, the first sending module 1603 is further configured to:

in response to receiving the sharing trigger request, generate a communication connection request based on the identification information of the second device;

send the communication connection request to the second device; and in response to receiving a confirmation request of the second device for the communication connection request, send the audio stream to be shared to the second device.

In some examples of the disclosure, as illustrated in FIG. 17, the apparatus further includes:

a third displaying module 1606, configured to, in response to receiving the confirmation request of the second device for the communication connection request, jointly display the identification information of the first device and the identification information of the second device.

In some examples of the disclosure, as illustrated in FIG. 17, the apparatus further includes: a first parsing module 1607, a first generating module 1608 and a second sending module 1609.

The first parsing module 1607 is configured to, in response to receiving a playback control request, parse control information from the playback control request.

The first generating module 1608 is configured to generate playback control instructions based on the control information and the identification information of the second device.

The second sending module 1609 is configured to send the playback control instructions to the second device based on the identification information of the second device, and perform playback control on the second device based on the playback control instructions.

In some examples of the disclosure, as illustrated in FIG. 17, the first displaying module 1602 is further configured to:

display an audio projection interface in the first device based on the audio sharing request, in which the audio projection interface comprises a shared audio control;

in response to receiving first trigger instructions for the shared audio control, jump from the audio projection interface to a shared audio interface in the first device; and display the identification information of the second device on the shared audio interface.

In some examples of the disclosure, as illustrated in FIG. 17, the apparatus further includes: a providing module 1610 and a second generating module 1611.

The providing module 1610 is configured to, before displaying the audio projection interface on the first device based on the audio sharing request, provide audio components in the first device.

The second generating module 1611 is configured to, in response to receiving second trigger instructions for the audio components, generate the audio sharing request.

Corresponding to the method for sharing an audio stream according to the above examples in FIG. 1 to FIG. 12, the disclosure further provides an apparatus for sharing an audio stream. Since the apparatus of the examples of the disclosure corresponds to the method of the above-mentioned examples of FIG. 1 to FIG. 12, the implementation of the method for sharing an audio stream is applicable to the apparatus for sharing an audio stream of the example of the disclosure, which will not be described in detail in the examples of the disclosure.

In this example, in response to receiving the audio sharing request, the second device state information of the second device is obtained. The identification information of the second device is displayed on the first device based on the second device state information. In response to receiving the sharing trigger request, the audio stream to be shared is sent to the second device based on the identification information of the second device. Since in response to receiving the sharing trigger request, the identification information of the second device is displayed on the first device based on the second device state information, so that it is convenient for the first device to rapidly search for the second device having the audio stream sharing needs, so as to realize audio stream sharing. Therefore, the process of sharing the audio stream is simplified, the convenience of the audio stream sharing operation is effectively improved, and the efficiency of sharing the audio stream and the sharing effect may be improved.

Figure 18:
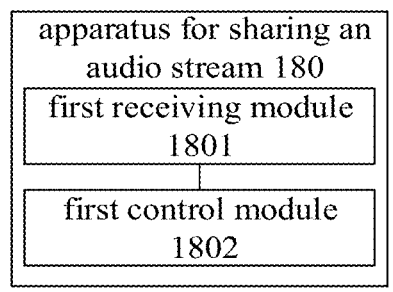
FIG. 18 is a structural schematic diagram of an apparatus for sharing an audio stream according to an example of the disclosure.

FIG. 18 is a structural schematic diagram of an apparatus for sharing an audio stream according to an example of the disclosure.

As illustrated in FIG. 18, the apparatus for sharing an audio stream 180 is applicable to a second device. The apparatus includes: a first receiving module 1801 and a first control module 1802.

The first receiving module 1801 is configured to, in response to receiving a sharing trigger request, receive an audio stream to be shared sent by a first device.

The first control module 1802 is configured to perform shared control on the audio stream to be shared.

Figure 19:
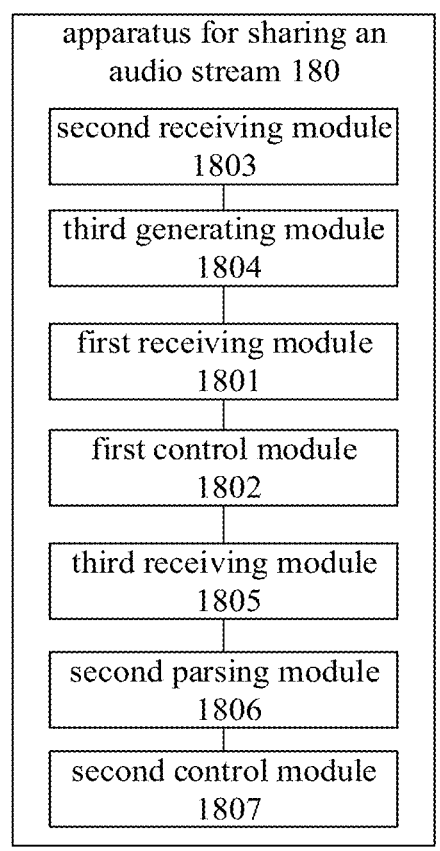
FIG. 19 is a structural schematic diagram of an apparatus for sharing an audio stream according to another example of the disclosure.

In some examples of the disclosure, as illustrated in FIG. 19, FIG. 19 is a structural schematic diagram of an apparatus for sharing an audio stream according to another example of the disclosure. The apparatus for sharing an audio stream 180 is applicable to the second device. The apparatus further includes: a second receiving module 1802 and a third generating module 1804.

The second receiving module 1803 is configured to, before receiving the audio stream to be shared sent by the first device in response to receiving the sharing trigger request, receive a communication connection request sent by the first device.

The third generating module 1804 is configured to generate a confirmation request for the communication connection request, and feedback the confirmation request to the first device.

In some examples of the disclosure, as illustrated in FIG. 19, the second device is a device connected to a speaker device in a scene where the first device is located.

The first control module 1802 is further configured to:
play the audio stream to be shared using the connected speaker device.

In some examples of the disclosure, as illustrated in FIG. 19, the apparatus further includes: a third receiving module 1805, a second parsing module 1806 and a second control module 1807.

The third receiving module 1805 is configured to receive playback control instructions sent by the first device.

The second parsing module 1806 is configured to obtain control information by parsing the playback control instructions.

The second control module 1807 is configured to perform playback control on the audio stream to be shared played by the connected speaker device based on the control information.

Corresponding to the method for sharing an audio stream according to the above examples in FIG. 13 to FIG. 15, the disclosure further provides an apparatus for sharing an audio stream. Since the apparatus of the examples of the disclosure corresponds to the method of the above-mentioned examples of FIG. 13 to FIG. 15, the implementation of the method for sharing an audio stream is applicable to the apparatus for sharing an audio stream of the example of the disclosure, which will not be described in detail in the examples of the disclosure.

In the example, in response to receiving the sharing trigger request, the audio stream to be shared sent by the first device is received, and sharing control is performed on the audio stream to be shared, since the first device searches for devices having the audio stream sharing needs according to the displayed identification information of the second device to obtain the second device, the process of sharing the audio stream is simplified, thus effectively improving the convenience for sharing the audio stream, and improving the efficiency of sharing the audio stream and the sharing effect.

In order to implement the above examples, the disclosure also provides a non-transitory computer-readable storage medium having computer programs stored thereon. When the computer programs are executed by a processor, the method for sharing an audio stream according to the first aspect of the disclosure, or the method for sharing an audio stream according to the second aspect of the disclosure is implemented.

In order to implement the above examples, the disclosure also provides an electronic device. The electronic device includes: a memory, a processor and computer programs stored on the memory and running on the processor. When the computer programs are executed by the processor, the method for sharing an audio stream according to the first aspect of the disclosure, or the method for sharing an audio stream according to the second aspect of the disclosure is implemented.

In order to implement the above examples, the disclosure also provides a computer program product having computer instructions stored thereon. When the computer instructions are executed, the method for sharing an audio stream according to the first aspect of the disclosure, or the method for sharing an audio stream according to the second aspect of the disclosure is implemented.

Figure 20:
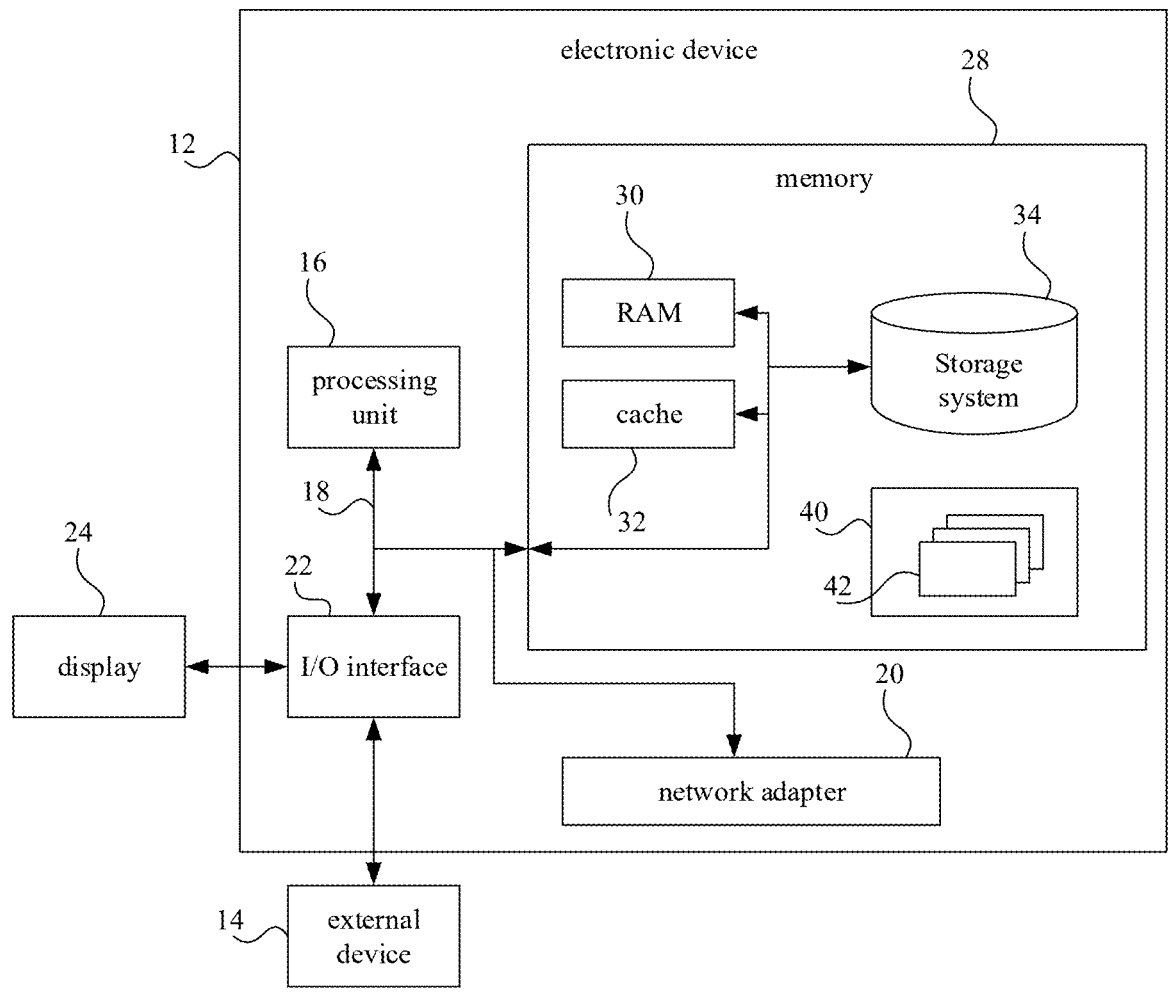
FIG. 20 is a block diagram of an exemplary electronic device suitable for implementing the example of the disclosure.

FIG. 20 is a block diagram of an exemplary electronic device suitable for implementing the examples of the disclosure. The electronic device 12 shown in FIG. 20 is an example, and should not impose any limitation on the functions and scope of use of the examples of the disclosure.

As illustrated in FIG. 20, the computer device 12 may be represented via a general computer device form. Components of the computer device 12 may include but be not limited to one or more processors or processing units 16, a system memory 28, a bus 18 connecting various system components including the system memory 28 and the processing units 16. The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (ISA) bus, a Micro Channel Architecture (MAC) bus, an enhanced ISA bus, a Video Electronics Standards Association (VESA) local bus and Peripheral Component Interconnection (PCI) bus.

The electronic device 12 typically includes a variety of computer system readable media. These media may be any available media accessible by the electronic device 12 and includes both volatile and non-volatile media, removable and non-removable media.

The memory 28 may include a computer system readable medium in the form of volatile memory, such as a random access memory (RAM) 30 and/or a high speed cache memory 32. The electronic device 12 may further include other removable or non-removable, volatile or non-volatile computer system storage media. By way of example, the storage system 34 may be configured to read and write a non-removable and non-volatile magnetic media (not shown in FIG. 20, commonly referred to as a "hard drive").

Although not shown in FIG. 20, a magnetic disk driver for reading from and writing to a removable and non-volatile magnetic disk (such as "floppy disk") and a disk driver for a removable and non-volatile optical disk (such as Compact Disk Read Only Memory (CD-ROM), Digital Video Disc Read Only Memory (DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various examples of the disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the examples described herein.

The electronic device 12 may also communicate with one or more external devices 14 (such as, a keyboard, a pointing device, a display 24, etc.). Furthermore, the electronic device 12 may also communicate with one or more communication devices enabling a user to interact with the electronic device 12 and/or other devices (such as a network card, modem, etc.) enabling the electronic device 12 to communicate with one or more computer devices. This communication may be performed via the Input/Output (I/O) interface 22. Also, the electronic device 12 may communicate with one or more networks (such as a LAN, a Wide Area Network (WAN) and/or a public network such as an Internet) through a network adapter 20. As shown, the network adapter 20 communicates with other modules of the electronic device 12 over the bus 18. It should be understood that, although not shown, other hardware and/or software modules may be used in connection with the electronic device 12. The hardware and/or software includes, but is not limited to, microcode, device drivers, redundant processing units, external disk drive arrays, RAID systems, tap drive and data backup storage system.

The processing unit 16 is configured to execute various functional applications and data processing by running programs stored in the system memory 28, for example, implementing the method for sharing an audio stream according to the above examples.

Other examples of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary, with a true scope of the disclosure being indicated by the claims.

It will be appreciated that the disclosure is not limited to the exact construction that has been described above and illustrated in the accompanying drawings, and that various modifications and changes may be made without departing from the scope thereof. It is intended that the scope of the disclosure be limited by the appended claims.

In addition, terms such as "first" and "second" are used herein for purposes of description and are not intended to indicate or imply relative importance or significance. In the description of the disclosure, "a plurality of" means two or more, unless specified otherwise.

Any process or method described in a flowchart or described herein in other ways may be understood to include one or more modules, segments or portions of codes of executable instructions for achieving specific logical functions or steps in the process, and the scope of a preferred example of the disclosure includes other implementations in which the functions may be executed out of the order shown or discussed, including executing the functions in a substantially simultaneous manner or in the reverse order depending upon the functions involved, which should be understood by those skilled in the art.

It should be understood that each part of the disclosure may be realized by the hardware, software, firmware or their combination. In the above examples, a plurality of steps or methods may be realized by the software or firmware stored in the memory and executed by the appropriate instruction execution system. For example, if it is realized by the hardware, likewise in another example, the steps or methods may be realized by one or a combination of the following techniques known in the art: a discrete logic circuit having a logic gate circuit for realizing a logic function of a data signal, an application-specific integrated circuit having an appropriate combination logic gate circuit, a Programmable Gate Array (PGA), and a Field Programmable Gate Array (FPGA).

It would be understood by those skilled in the art that all or a part of the steps carried by the method in the above-described examples may be completed by relevant hardware instructed by a program. The program may be stored in a computer readable storage medium. When the program is executed, one or a combination of the steps of the method in the above-described examples may be completed.

In addition, individual functional units in the examples of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD.

Reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

Although explanatory embodiments have been shown and described, it would be appreciated by those skilled in the art that the above embodiments cannot be construed to limit the disclosure, and changes, alternatives, and modifications may be made in the embodiments without departing from scope of the disclosure.

The invention claimed is:

1. A method for sharing an audio stream, comprising:
in response to receiving an audio sharing request, obtaining, by a first device, state information of a second device;
displaying, by the first device, identification information of the second device based on the state information of the second device; and
in response to receiving a sharing trigger request, sending, by the first device, an audio stream to be shared to the second device based on the identification information of the second device;
wherein displaying the identification information of the second device on the first device comprises:
displaying, by the first device, an audio projection interface based on the audio sharing request, wherein the audio projection interface comprises a shared audio control;
in response to receiving first trigger instructions for the shared audio control, jumping, by the first device, from the audio projection interface to a shared audio interface on the first device; and
displaying, by the first device, the identification information of the second device on the shared audio interface.

2. The method of claim 1, wherein obtaining the state information of the second device comprises:
obtaining a second device location of the second device as the state information of the second device; and
wherein displaying the identification information of the second device comprises:
displaying, by the first device, the identification information of the second device based on the second device location.

3. The method of claim 2, wherein in response to receiving the audio sharing request, obtaining the state information of the second device comprises:
in response to receiving the audio sharing request, obtaining, by the first device, a first device location of the first device; and in response to detecting the second device exists in a scene where the first device is located based on the first device location, obtaining, by the first device, the second device location.

4. The method of claim 3, wherein detecting the second device exists in the scene where the first device is located comprises:
determining, by the first device, a scanning area based on the first device location; and
in response to detecting a device connected to a speaker device in the scanning area, determining, by the first device, the device connected to the speaker device as the second device.

5. The method of claim 3, wherein obtaining the second device location comprises:
determining, by the first device, a relative location between a real location of the second device and a reference device location as the second device location.

6. The method of claim 5, further comprising:
determining, by the first device, the first device location as the reference device location.

7. The method of claim 5, wherein displaying the identification information of the second device comprises:
determining, by the first device, an interface display location based on the second device location; and
displaying, by the first device, the identification information of the second device based on the interface display location.

8. The method of claim 7, wherein determining the interface display location comprises:
determining, by the first device, a relative distance value between the second device location and the reference device location;
determining, by the first device, a display distance value based on the relative distance value, wherein the display distance value is configured to describe a display distance between the interface display location and a reference display location of the first device; and
generating, by the first device, the interface display location based on the reference display location and the display distance value.

9. The method of claim 8, wherein,
in response to determining that a plurality of second devices exist, the second devices comprise a plurality of relative distance values, a first variation relation exists among a plurality of display distance values, a second variation relation exists among the relative distance values corresponding to the display distance values, and the first variation relation is positively correlated to the second variation relation.

10. The method of claim 8, further comprising:
displaying, by the first device, identification information of the first device at the reference display location.

11. The method of claim 1, wherein in response to receiving the sharing trigger request, sending the audio stream to be shared to the second device comprises:
in response to receiving the sharing trigger request, generating, by the first device, a communication connection request based on the identification information of the second device;
sending, by the first device, the communication connection request to the second device; and
in response to receiving a confirmation of the second device for the communication connection request, sending, by the first device, the audio stream to be shared to the second device.

12. The method of claim 11, further comprising:
in response to receiving the confirmation of the second device for the communication connection request, jointly displaying, by the first device, the identification information of the first device and the identification information of the second device.

13. The method of claim 1, further comprising:
in response to receiving a playback control request, parsing, by the first device, control information from the playback control request;
generating, by the first device, playback control instructions based on the control information and the identification information of the second device; and
sending, by the first device, the playback control instructions to the second device based on the identification information of the second device, and performing playback control on the second device based on the playback control instructions.

14. The method of claim 1, wherein before displaying the audio projection interface on the first device based on the audio sharing request, the method further comprises:
adding, by the first device, audio components to a display interface of the first device; and
in response to receiving second trigger instructions for the audio components, generating by the first device, the audio sharing request.

15. A method for sharing an audio stream, comprising:
in response to receiving a sharing trigger request, receiving, by a second device, an audio stream to be shared sent by a first device; and
controlling, by the second device, play of the audio stream to be shared;
wherein an audio projection interface that comprises a shared audio control is displayed by the first device based on an audio sharing request, the audio projection interface is jumped by the first device to a shared audio interface on the first device in response to first trigger instructions for the shared audio control being received, and identification information of the second device is displayed by the first device on the shared audio interface.

16. The method of claim 15, further comprising:
receiving, by the second device, a communication connection request sent by the first device; and
generating, by the second device, a confirmation for the communication connection request, and feeding back the confirmation to the first device.

17. The method of claim 15, wherein the second device is a device connected to a speaker device in a scene where the first device is located; and
wherein controlling the audio stream to be shared comprises:
playing, by the second device, the audio stream to be shared using the connected speaker device.

18. The method of claim 17, further comprising:
receiving, by the second device, playback control instructions sent by the first device;
obtaining, by the second device, control information by parsing the playback control instructions; and
controlling, by the second device, the connected speaker device to play the audio stream to be shared based on the control information.

19. A system for sharing an audio stream, comprising:
a speaker, configured to play the audio stream;
a first device, configured to obtain state information of a second device in response to receiving an audio sharing request; display identification information of the second device based on the state information of the second device; and send the audio stream to the second device based on the identification information of the second device, in response to receiving a sharing trigger request; and
a second device, connected to the speaker and configured to control the play of the speaker,
wherein the first device is further configured to:
display an audio projection interface based on the audio sharing request, wherein the audio projection interface comprises a shared audio control;
in response to receiving first trigger instructions for the shared audio control, jump from the audio projection interface to a shared audio interface on the first device; and
display the identification information of the second device on the shared audio interface.

* * * * *